(12) United States Patent
Granot

(10) Patent No.: US 12,011,114 B2
(45) Date of Patent: Jun. 18, 2024

(54) FOODSTUFF PREPARATION DEVICE

(71) Applicant: Eitan Granot, Beer Yaacov (IL)

(72) Inventor: Eitan Granot, Beer Yaacov (IL)

(*) Notice: Subject to any disclaimer, the term of this patent is extended or adjusted under 35 U.S.C. 154(b) by 669 days.

(21) Appl. No.: 17/206,676

(22) Filed: Mar. 19, 2021

(65) Prior Publication Data

US 2021/0204755 A1 Jul. 8, 2021

Related U.S. Application Data

(63) Continuation-in-part of application No. PCT/IB2019/059313, filed on Oct. 30, 2019.

(60) Provisional application No. 62/774,564, filed on Dec. 3, 2018.

(51) Int. Cl.
| | |
|---|---|
| *A47J 42/16* | (2006.01) |
| *A47J 42/06* | (2006.01) |
| *A47J 42/50* | (2006.01) |
| A23N 12/08 | (2006.01) |
| A23N 12/10 | (2006.01) |
| A47J 42/20 | (2006.01) |

(52) U.S. Cl.
CPC ............. *A47J 42/06* (2013.01); *A47J 42/16* (2013.01); *A47J 42/50* (2013.01); *A23N 12/083* (2013.01); *A23N 12/10* (2013.01); *A47J 42/20* (2013.01)

(58) Field of Classification Search
CPC .. A47J 42/52; A47J 42/50; A47J 42/06; A47J 42/16; A47J 42/20; A47J 42/36; A23L 25/30
See application file for complete search history.

(56) References Cited

U.S. PATENT DOCUMENTS

| | | | | |
|---|---|---|---|---|
| 1,862,166 A | * | 6/1932 | Steely | A23G 1/02 |
| | | | | 426/482 |
| 2,045,211 A | * | 6/1936 | Whitfield | A47J 42/52 |
| | | | | 241/98 |
| 2,212,544 A | * | 8/1940 | Lund | A23G 1/02 |
| | | | | 426/489 |

(Continued)

FOREIGN PATENT DOCUMENTS

| | | |
|---|---|---|
| CH | 314304 A | 6/1956 |
| CN | 106235360 A | 12/2016 |

(Continued)

*Primary Examiner* — Reginald Alexander
(74) *Attorney, Agent, or Firm* — PATENTFILE, LLC; Bradley C. Fach; Steven R. Kick

(57) ABSTRACT

A foodstuff preparation device may include a roasting chamber having grinding funnel configured for communicating a foodstuff, having a pre-ground particle size, between two or more grinding stones, such as a first grinding stone and a second grinding stone. A grinding motor may be configured to motivate the foodstuff between the two or more grinding stone so that the foodstuff exits from between a first grinding stone and second grinding stone with a first ground particle size, the first ground particle size smaller than the pre-ground particle size. Generally, the device may be configured to prepare foodstuffs, such as sesame seeds, by roasting and grinding them to produce Tahini, or any other similar prepared food. Optionally, the foodstuff may be communicated into the grinding funnel from a dispensing funnel or from a roasting cavity having a heating element configured to govern the temperature of the roasting cavity.

18 Claims, 21 Drawing Sheets

(56) References Cited

U.S. PATENT DOCUMENTS

| | | | | |
|---|---|---|---|---|
| 4,037,798 A | * | 7/1977 | Schnitzer | A47J 42/18 |
| | | | | 241/246 |
| 4,187,992 A | * | 2/1980 | Del Valle | A47J 42/06 |
| | | | | 241/101.8 |
| 4,484,064 A | | 11/1984 | Murray | |
| 4,895,308 A | | 1/1990 | Tanaka | |
| 5,307,733 A | * | 5/1994 | Enomoto | A47J 31/545 |
| | | | | 99/305 |
| 5,687,922 A | * | 11/1997 | Takaoka | B02C 2/10 |
| | | | | 241/261.1 |
| 9,545,169 B2 | | 1/2017 | Stordy et al. | |
| 2011/0089274 A1 | * | 4/2011 | Amano | B02C 7/08 |
| | | | | 241/46.02 |
| 2013/0276637 A1 | | 10/2013 | Stordy et al. | |
| 2016/0295906 A1 | | 10/2016 | Jacobsen et al. | |
| 2016/0316970 A1 | | 11/2016 | Ryan et al. | |
| 2018/0000108 A1 | | 1/2018 | Boggavarapu | |
| 2019/0166899 A1 | | 6/2019 | Perentes et al. | |

FOREIGN PATENT DOCUMENTS

| | | |
|---|---|---|
| EP | 3202290 A1 | 8/2017 |
| WO | 2005058073 A1 | 6/2005 |
| WO | 2017171118 A1 | 10/2017 |
| WO | 2018069182 A1 | 4/2018 |

\* cited by examiner

FOODSTUFF PREPARATION DEVICE

CROSS REFERENCE TO RELATED APPLICATIONS

This application claims priority to and the benefit of international patent application no. PCT/IB2019/059313 filed on Oct. 30, 2019 which in turn claims the benefit and the filing date of U.S. Provisional Application No. 62/774,564, filed on Dec. 3, 2018, entitled "Appliance for producing Tahini (Sesame seeds paste condiment) and other food items", both of which is hereby incorporated by reference in its entirety.

FIELD OF THE INVENTION

This patent specification relates to the field of food and condiment making devices. More specifically, this patent specification relates to a device which may be used to roast and grind foodstuffs.

BACKGROUND

Many foodstuffs require one or more steps for preparation. For example, Tahini, a paste made of ground roasted or non-roasted, hulled or non-hulled sesame seeds, is consumed as a staple Mediterranean food, and currently cannot be produce at home in one appliance. Unfortunately, people are required either to buy Tahini as pre-packaged, processed food product. One of the main drawbacks of pre-packaged or store-bought Tahini is that along its shelf life the quality and nutritional values derogates, and often the oil phase of the sesame seeds paste is separated from the fiber/protein mass. The innovation.

Therefore, a need exists for a novel foodstuff preparation device. A further need exists for a novel foodstuff preparation device that is able to produce ready to use and fresh foodstuffs, such as Tahini. There is also a need for a novel foodstuff preparation device that is able to maintain the nutritional values of foodstuffs prepared by the device. Finally, a need exists for a novel foodstuff preparation device that is able to produce foodstuffs in the form of a homogeneous paste, ready for further use.

BRIEF SUMMARY OF THE INVENTION

A foodstuff preparation device is provided. Generally, the device may be configured to prepare foodstuffs, such as sesame seeds, grinding and optionally roasting them to produce Tahini, or any other similar prepared food. In some embodiments, the device may include a grinding funnel which may be configured to communicate a foodstuff, having a pre-ground particle size, between a first grinding stone and a second grinding stone. A grinding motor may be configured to motivate the foodstuff between the first grinding stone and second grinding stone so that the foodstuff exits from between the first grinding stone and second grinding stone with a first ground particle size, the first ground particle size smaller than the pre-ground particle size.

In further embodiments, the device may include a dispensing funnel which may be positioned above the grinding funnel and which may be configured to communicate the foodstuff, having a pre-ground particle size, into the grinding funnel.

In further embodiments, the device may include a roasting chamber having a roasting cavity and a heating element that may be configured to govern the temperature of the roasting cavity. A foodstuff, having a pre-ground particle size, may be communicated from the roasting chamber to between a first grinding stone and a second grinding stone via the grinding funnel. A grinding motor may be configured to motivate the foodstuff between the first grinding stone and second grinding stone so that the foodstuff exits from between the first grinding stone and second grinding stone with a first ground particle size, the first ground particle size smaller than the pre-ground particle size.

In further embodiments, the device may include a third grinding stone and the grinding motor may be configured to motivate the foodstuff between the second grinding stone and third grinding stone so that the foodstuff exits from between the second grinding stone and third grinding stone with a second ground particle size, the second ground particle size smaller than the first ground particle size.

In still further embodiments, the device may include a third grinding stone and a fourth grinding stone, and the grinding motor may be configured to motivate the foodstuff exiting from between the first grinding stone and second grinding stone to travel between the third grinding stone and a fourth grinding stone so that the foodstuff exits from between the third grinding stone and fourth grinding stone with a second ground particle size, the second ground particle size smaller than the first ground particle size.

In yet further embodiments, the device may include a roasting motor which may be configured to rotate the roasting chamber.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
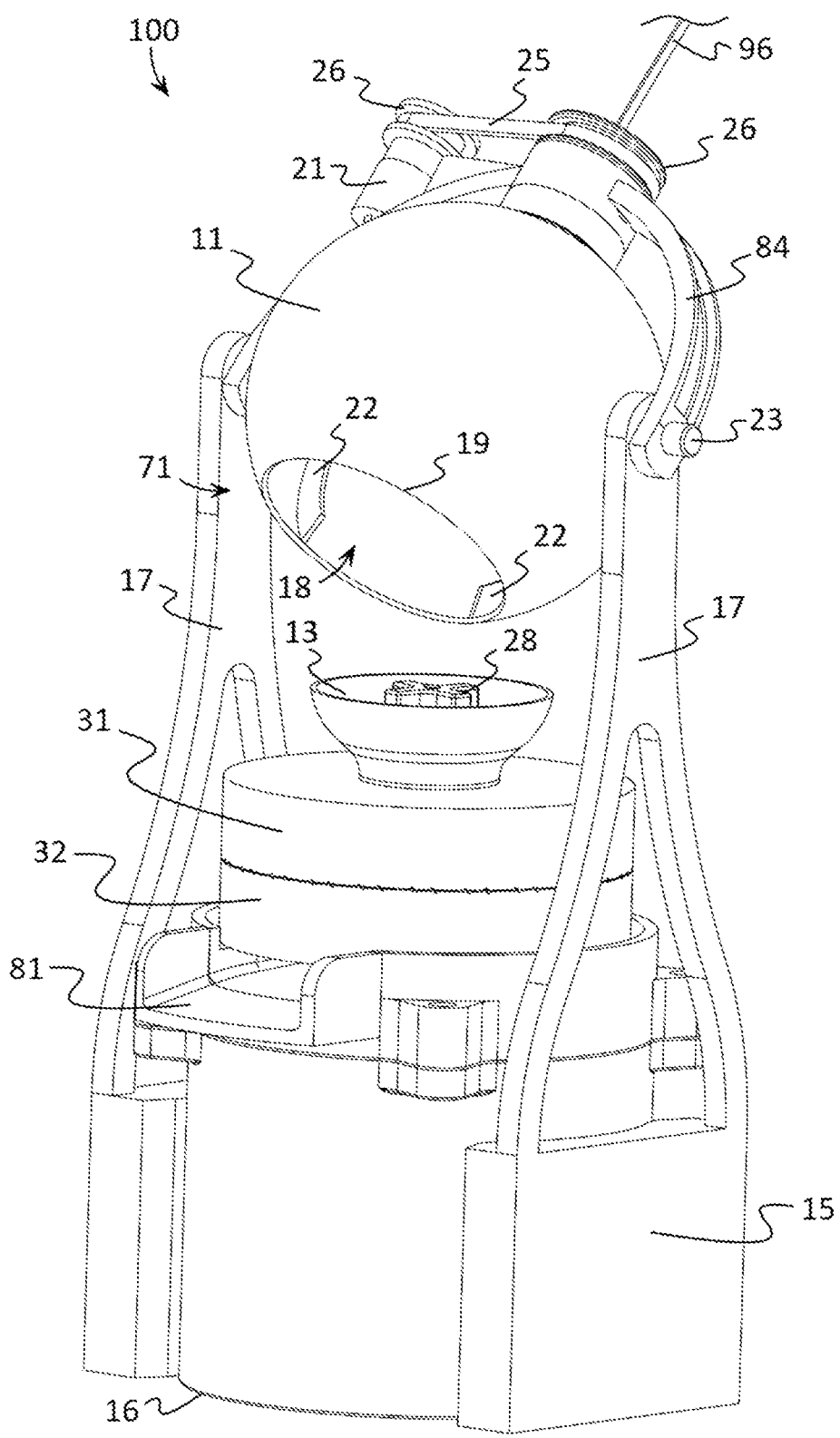
FIG. 1 depicts a perspective view of an example of a foodstuff preparation device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new foodstuff preparation device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 1-11 and 17-23 illustrate examples of a foodstuff preparation device ("the device") 100 according to various embodiments. In some embodiments, the device 100 may comprise a grinding funnel 13 which may be configured to communicate a foodstuff 400, having a pre-ground particle size, between a first grinding stone 31 and a second grinding stone 32. A grinding motor 14 may be configured to motivate the foodstuff 400 between the first grinding stone 31 and second grinding stone 32 so that the foodstuff 400 exits from between the first grinding stone 31 and second grinding stone 32 with a first ground particle size, the first ground particle size smaller than the pre-ground particle size.

In further embodiments and as perhaps best shown in FIGS. 18-23, the device 100 may include a dispensing funnel 35 which may be positioned above the grinding funnel 13 and which may be configured to communicate the foodstuff 400, having a pre-ground particle size, into the grinding funnel 13.

In further embodiments and as perhaps best shown in FIGS. 1-11, the device 100 may include a roasting chamber 11 having a roasting cavity 18 and a heating element 12 that may be configured to govern the temperature of the roasting cavity 18. A foodstuff 400, having a pre-ground particle size, may be communicated from the roasting chamber 11 to between a first grinding stone 31 and a second grinding stone 32 via a grinding funnel 13. A grinding motor 14 may be configured to motivate the foodstuff 400 between the first grinding stone 31 and second grinding stone 32 so that the foodstuff 400 exits from between the first grinding stone 31 and second grinding stone 32 with a first ground particle size, the first ground particle size smaller than the pre-ground particle size. Generally, the device 100 may be configured to prepare foodstuffs 400, such as sesame seeds, by roasting and grinding them to produce Tahini, or any other similar prepared food.

The device 100 may be configured to reduce the particle size of foodstuffs 400 from a pre-ground particle size to a first ground particle size. A pre-ground particle size generally refers to whole seed (not previously ground), such as whole sesame seeds, whole peanuts, etc. A first ground particle size generally refers to a particle size that is smaller than the pre-ground particle size which is effected via the foodstuff 400 passing between two or more grinding interfaces 41, 42, 43, 44, 51, 61. A second ground particle size generally refers to a particle size that is smaller than the first ground particle size which is effected via the foodstuff 400 having a first ground particle size passing between two or more grinding interfaces 41, 42, 43, 44, 51, 61.

The device 100 may comprise a housing 15 which may be configured to position one or more elements of the device 100 relative to one or more other elements of the device 100. In preferred embodiments, the housing 15 may be configured to position and couple a roasting chamber 11 relative and to the one or more grinding stones 31, 32, 33, 34, of the device 100. The housing 15 may comprise a base 16 which may support to device 100 on an object or surface upon which it may be placed, such as a table or counter top. The housing 15 may also comprise one or more chamber supports 17 which may couple and position the roasting chamber 11 to and preferably above the one or more grinding stones 31, 32, 33, 34.

A housing 15, and therefore a base 16 and chamber supports 17, may be configured in any size and shape. The housing 15, and therefore a base 16 and chamber supports 17, also may be made from or may comprise any material including combinations of materials. For example, housing 15 may include substantially rigid materials, such as metal and metal alloys, hard plastics, including polyethylene (PE), Ultra-high-molecular-weight polyethylene (UHMWPE, UHMW), polypropylene (PP) and polyvinyl chloride (PVC), polycarbonate, nylon, hard rubbers, wood, other plant based materials; cushioning materials, such as silicone foams, rubber foams, urethane foams including plastic foams, neoprene foam, latex foam rubber, polyurethane foam rubber, or elastomer materials such as elastic plastics, elastic silicone, elastic rubbers; and/or any other material including combinations of materials.

The device 100 may comprise a roasting chamber 11 having a roasting cavity 18 which may be size and shaped to hold a desired volume of a foodstuff 400, such as sesame seeds, peanuts, almonds, coffee beans, etc. A roasting chamber 11 and its roasting cavity 18 may be configured in any size and shape. For example, and as shown in FIGS. 1-8 and 11, in some embodiments, a roasting chamber 11 and its roasting cavity 18 may be configured to be generally spherical shaped. As another example, and as shown in FIGS. 9 and 10, in some embodiments, a roasting chamber 11 and its roasting cavity 18 may be configured to be generally cylindrical in shape. The roasting chamber 11 may comprise an entrance aperture 19, of any size and shape, which may allow access to the roasting cavity 18 so that foodstuff 400 may enter and exit the roasting cavity 18 via the entrance aperture 19. It should be understood that the device 100 may be used without heating or roasting a foodstuff 400 placed in the roasting chamber 11. For example, a user may purchase roasted sesame seeds and the user may pour the roasted seeds into the roasting chamber 11, which may only serve as a feeder to the grinding stones 31, 32, 33, 34, skipping the roasting stage.

Figure 8:
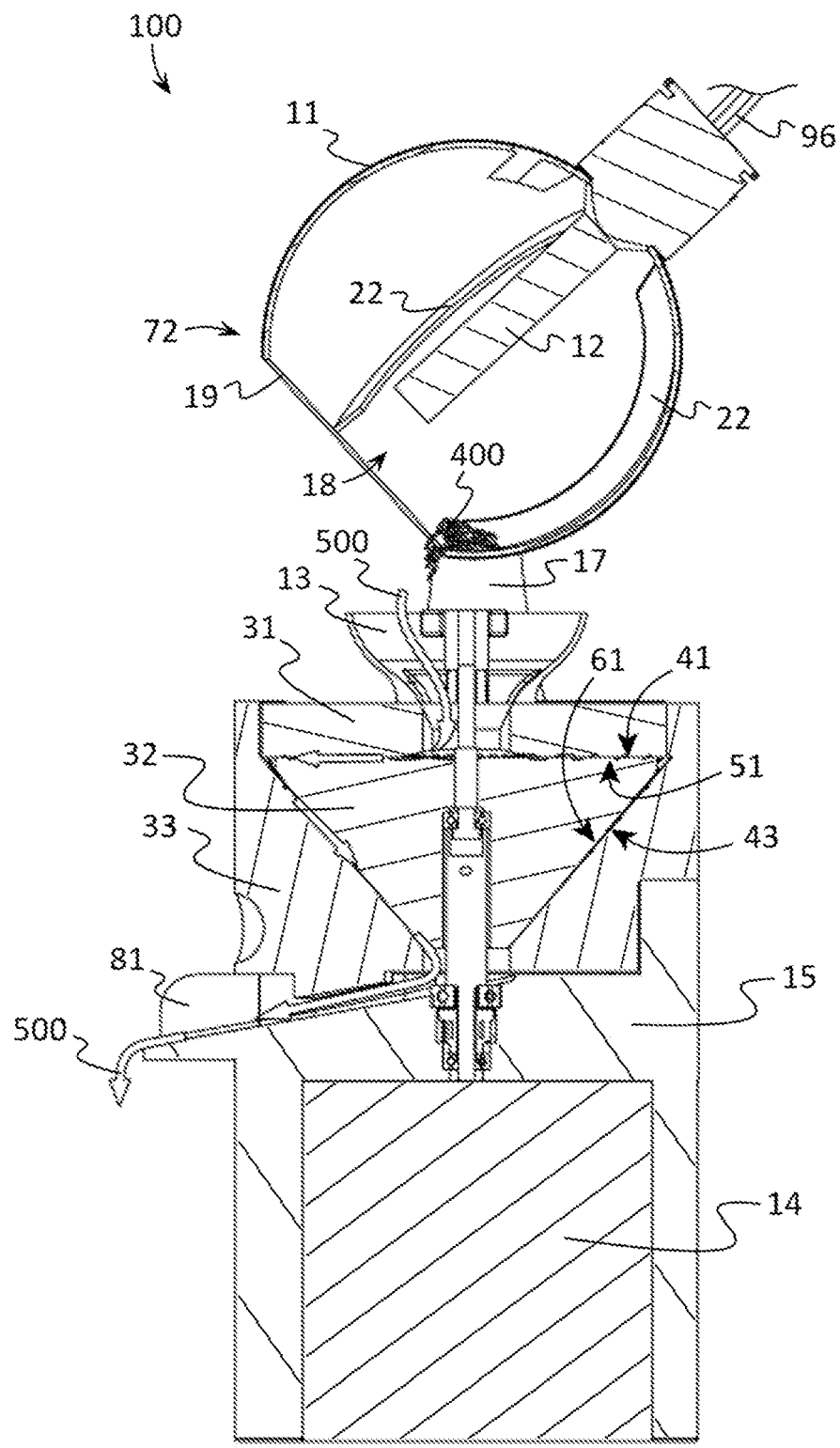
FIG. 8 illustrates a sectional elevation view of still another example of a foodstuff preparation device according to various embodiments described herein.
Figure 9:
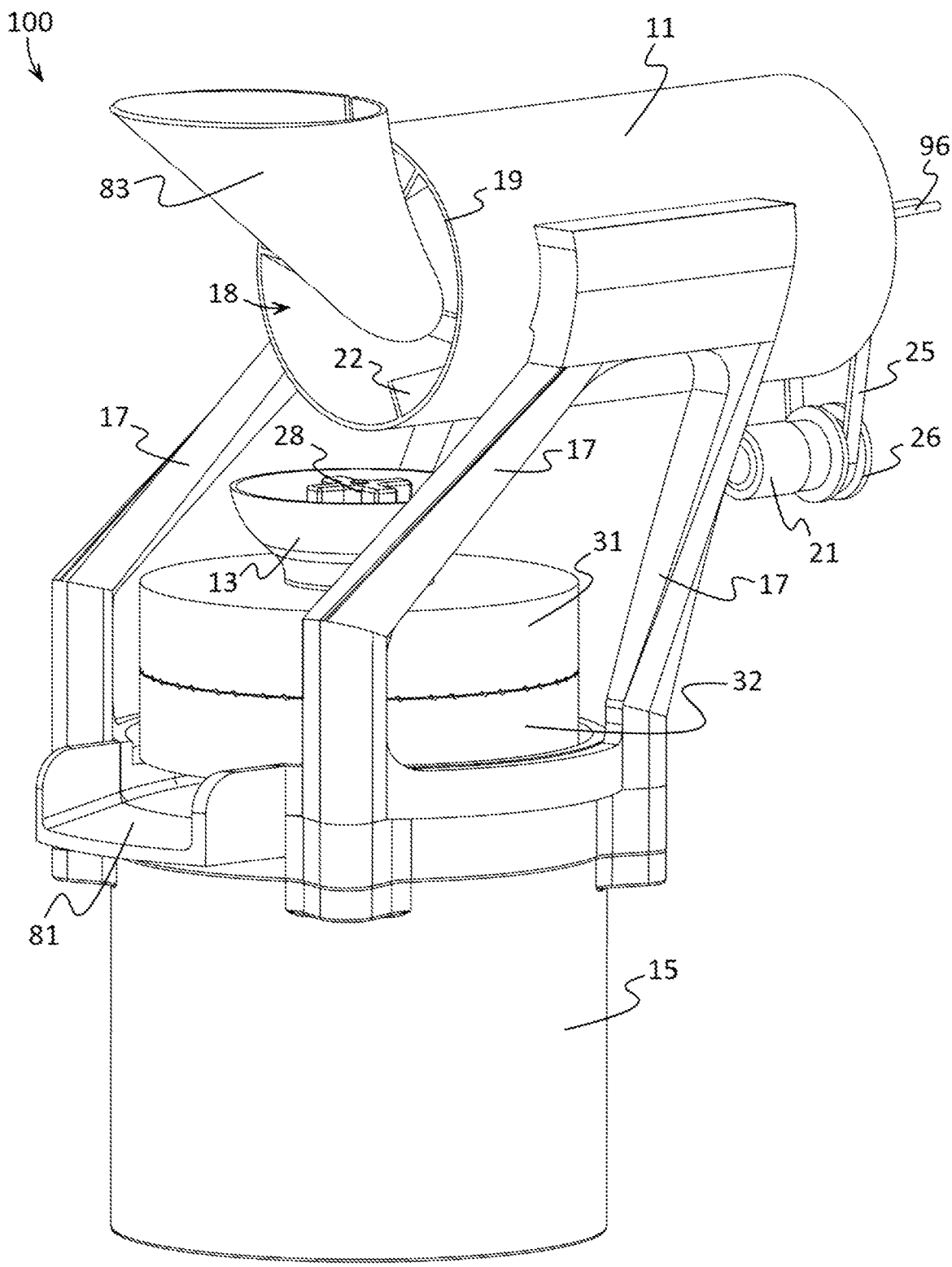
FIG. 9 shows a perspective view of yet another example of a foodstuff preparation device according to various embodiments described herein.
Figure 10:
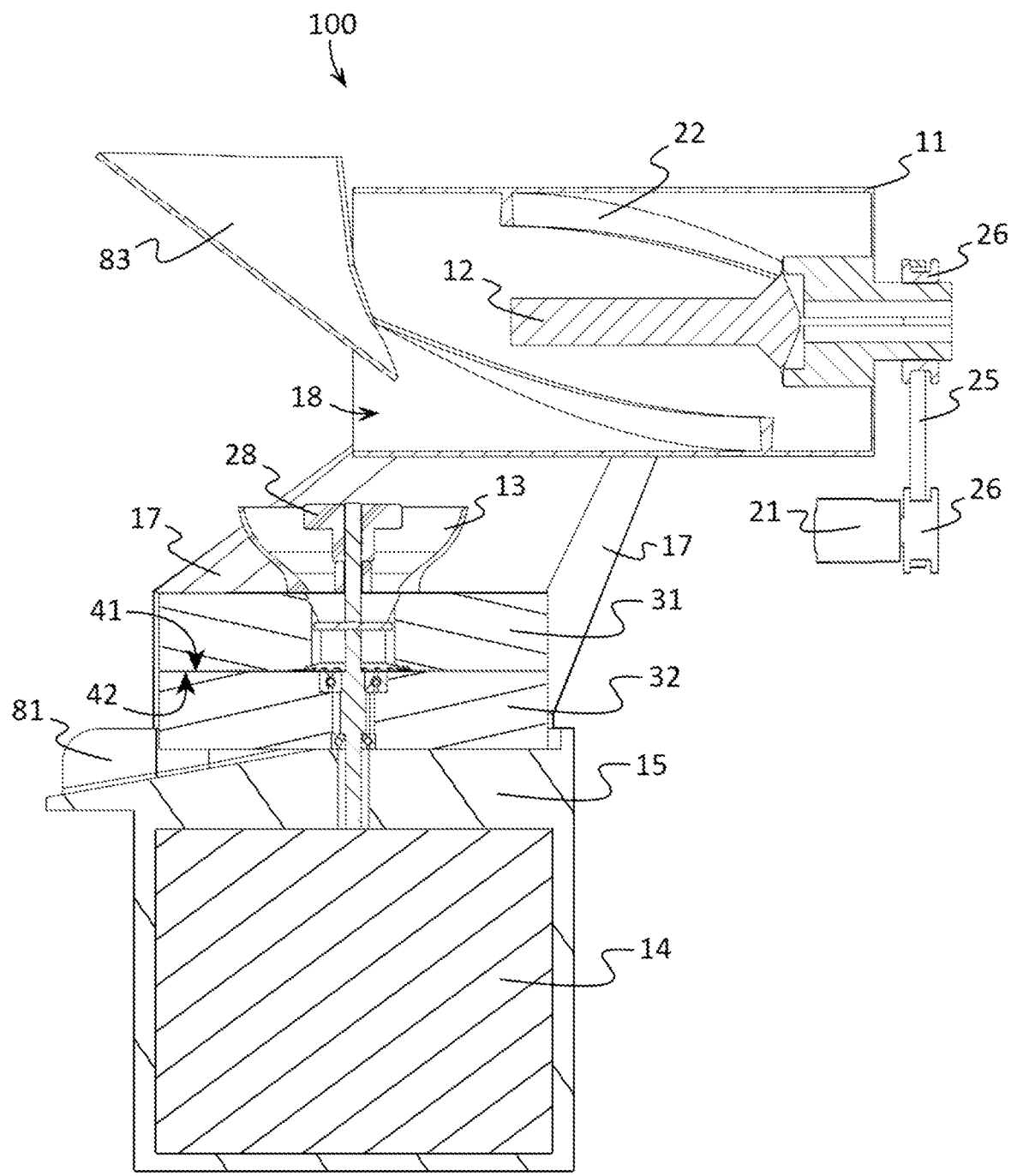
FIG. 10 depicts a sectional elevation view of yet another example of a foodstuff preparation device according to various embodiments described herein.
Figure 11:
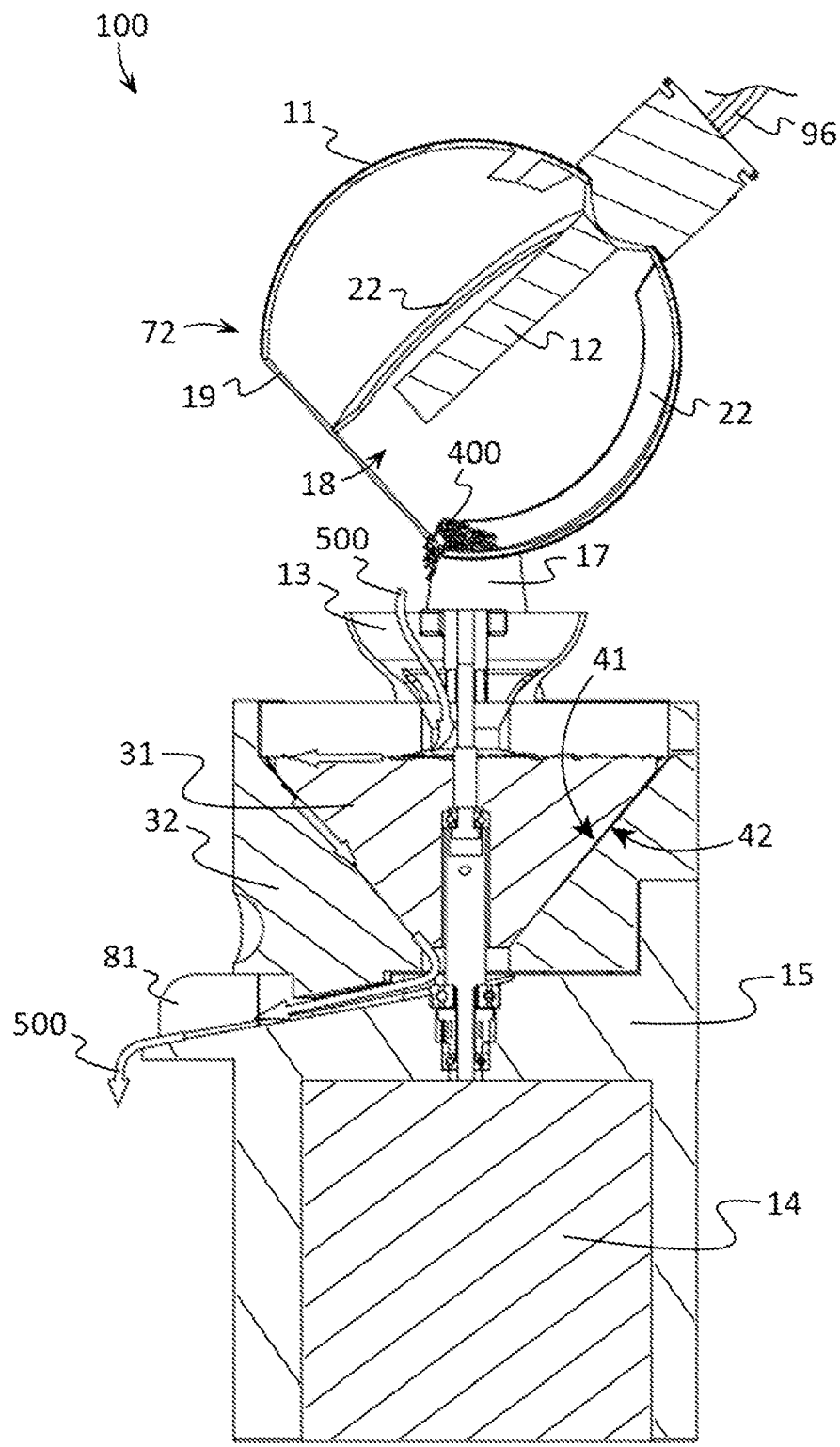
FIG. 11 illustrates a sectional elevation view of still yet another example of a foodstuff preparation device according to various embodiments described herein.

In some embodiments, and as shown in FIGS. 9 and 10, the device 100 may comprise a hopper 83 which may be configured to function generally as a funnel for directing a foodstuff 400 into the roasting cavity 18 of the roasting chamber 11 in a similar manner as a grinding funnel 13 may direct the movement of foodstuff between two or more grinding stones 31, 32, 33, 34 (illustrated with arrows showing foodstuff direction of travel 500 in FIGS. 8 and 11). A hopper 83 may be configured in any size and shape.

In some embodiments, a roasting chamber 11 may be movably coupled to the housing 15. In preferred embodiments, a roasting chamber 11 may be movably coupled to the housing 15 so that the roasting chamber 11 may rotate relative to the housing 15. The device 100 may comprise a roasting motor 21, and the roasting motor 21 may be configured to rotate the roasting chamber 11. In some embodiments, a roasting motor 21 may comprise a brushed DC motor, brushless DC motor, switched reluctance motor, universal motor, AC polyphase squirrel-cage or wound-rotor induction motor, AC SCIM split-phase capacitor-start motor, AC SCIM split-phase capacitor-run motor, AC SCIM split-phase auxiliary start winding motor, AC induction shaded-pole motor, wound-rotor synchronous motor, hysteresis motor, synchronous reluctance motor, pancake or axial rotor motor, stepper motor, or any other type of motor. In further embodiments, a roasting motor 21 may comprise a hydraulic motor such as a Gear and vane motor, Gerotor motor, Axial plunger motors, Radial piston motors, or any other hydraulically motivated motor. In still further embodiments, a roasting motor 21 may comprise a pneumatic motor, such as a linear pneumatic motor and a pneumatic rotary vane motor, actuator such as which may be used for a roasting motor 21 or positional motivator 24, or any other device or method which may be used to rotate or otherwise move the roasting chamber 11 relative to the housing 15. Movement from a roasting motor 21 may be communicated to the roasting chamber 11 via gearing, belt 25 and pullies 26, drive shaft 27 or any other suitable method.

In some embodiments, the device 100 may comprise one or more agitators 22 which may be positioned in a roasting cavity 18 and which may be used to agitate or motivate the movement of foodstuff 400 within the roasting cavity 18. Agitators 22 may be configured in any size and shape. In preferred embodiments, one or more agitators 22 may be shaped or configured as a spiral blade or Archimedes' screw-type arrangement so that rotation of a roasting cavity 18 that the one or more agitators 22 are positioned in may cause the agitators 22 motivate the movement of foodstuff 400 within the roasting cavity 18 towards or away from the entrance aperture 19 based on the direction of rotation of the roasting chamber 11 of the roasting cavity 18. For example, a roasting motor 21 may be configured to rotate the roasting chamber 11 in a first direction, such as clockwise, and an opposing second direction, such as counter-clockwise. Rotation of the roasting chamber 18 in the first or clockwise direction may cause the agitator(s) 22 to prevent a foodstuff 400 from exiting the roasting chamber 18 be motivating the foodstuff 400 away from the entrance aperture 19. Conversely, and rotation of the roasting chamber in the second or counter-clockwise direction may cause the agitator(s) 22 to motivate the foodstuff 400 to exit the roasting chamber 11 into a grinding funnel 13 by motivating the foodstuff 400 towards the entrance aperture 19.

In some embodiments, a roasting chamber 11 may be movably coupled to the housing 15 so that the roasting chamber 11 may pivot relative to the housing 15 or otherwise be movable between a first position 71 (FIGS. 3-6) and a second position 72 (FIGS. 1, 2, 7, 8, and 9). A roasting chamber 11 may be movably coupled to a chamber support 17 or other element of the housing 15 via one or more pivotal couplings 23 and roasting arms 84 which may allow the roasting chamber 11 to pivot, rotate or otherwise move relative to the housing 15. A pivotal coupling 23 may comprise a rivet, bearing, such as a bushing, a journal bearing, a sleeve bearing, a rifle bearing, a rolling-element (e.g. ball or roller) bearing, a jewel bearing, a fluid bearing, a magnetic bearing, a flexure bearing, a composite bearing, nut and bolt, knuckle joint, a turnbuckle, a pin joint, a pivot joint, a cotter joint, a bolted joint, a flexible material joint, a screw joint, a universal joint, a butt hinge, butterfly hinge, flush hinge, barrel hinge, concealed hinge, continuous hinge, T-hinge, strap hinge, double-acting hinge, Soss hinge, a flexible material hinge, a four-bar linkage, a scissor linkage, a collapsible pole linkage, or any other suitable mechanical or physical linkage which may be used to couple a first element or component to a second element or component while allowing the first element or component to move, pivot, or rotate relative to the second element or component.

In a first position 71, an entrance aperture 19 of the roasting chamber 11 may be moved away from the grinding funnel 13 so that all or portions of the entrance aperture 19 are positioned above the one or more pivotal coupling 23 which may pivotally couple the roasting chamber 11 to a chamber support 17 or other element of the housing 15. In this manner, foodstuff 400 may be prevented from exiting the roasting chamber 11 when the roasting chamber 11 is in the first position 71. In a second position 72, an entrance aperture 19 of the roasting chamber 11 may be moved towards the grinding funnel 13 so that all or portions of the entrance aperture 19 may be positioned blow the one or more pivotal couplings 23 which may pivotally couple the roasting chamber 11 to a chamber support 17 or other element of the housing 15. In this manner, foodstuff 400 may exit the roasting chamber 11 into the grinding funnel 13, such as by being poured and/or being motivated by one or more agitators 22, when the roasting chamber 11 is in the second position 72.

Optionally, a roasting chamber 11 may be moved between the first position 71 and second position 72 via a positional motivator 24. A positional motivator 24 may comprise any type of comb drive, digital micromirror device, solenoid, electric motor, electroactive polymer, hydraulic cylinder, piezoelectric actuator, pneumatic actuator, servomechanism, thermal bimorph, screw jack, a motor, such as which may be used for a roasting motor 21, or any other type of hydraulic, pneumatic, electric, mechanical, thermal, magnetic type of actuator, or any other type of actuator.

The device 100 may comprise one or more heating elements 12 which may be configured to govern the temperature of the roasting chamber 11 and/or the roasting cavity 18. In this manner, the heating element(s) 12 may control the temperature of a foodstuff 400 within the roasting cavity 18. In some embodiments, an agitator 22 may comprise a heating element 12. In further embodiments, a heating element 12 may be positioned within the roasting cavity 18. In still further embodiments, a heating element 12 may be in thermal communication with an agitator 22 and/or other portion of the roasting chamber 11.

In preferred embodiments, a heating element 12 may be configured to govern the temperature of the roasting cavity 18 by heating the roasting cavity 18 and any foodstuff 400 therein to approximately between 110 to 180 degrees Celsius (230 to 350 degrees Fahrenheit). In further embodiments, a heating element 12 may be configured to govern the temperature of the roasting cavity 18 by cooling the roasting cavity 18 and any foodstuff 400 therein. A heating element 12 may comprise one or more Peltier chips, metal heating elements, such as nichrome, Kanthal (FeCrAl), and the like, ceramic heating elements, such as molybdenum disilicide (MoSi2), polymer heating elements, such as PTC rubber, composite heating elements, such as fine coil of nichrome (NiCr) resistance heating alloy wire, that is located in a metallic tube (of stainless steel alloys, such as Incoloy, or copper) and insulated by magnesium oxide powder, and combination heating element systems, such as those using thick film technology, micro-refrigeration coils, or any other device that converts electricity into heat and/or removes heat for cooling purposes.

The device 100 may comprise one or more grinding funnels 13, such as a first grinding funnel 13A and a second grinding funnel 13B (FIGS. 4, 5, 20, and 21), which may be configured to communicate or otherwise direct a foodstuff 400 between two or more grinding stones 31, 32, 33, 34. A grinding funnel 13 may be configured in any shape and size. Preferably, a grinding funnel 13 may be wider or larger on a receiving or upper end of the grinding funnel 13 and narrower or smaller on an exiting or lower end of the grinding funnel 13. In some embodiments, a first grinding funnel 13A may be coupled to the housing 15 and positioned to communicate a foodstuff 400 exiting from a roasting chamber 11 or dispensing funnel 35 to travel between a first grinding stone 31 and a second grinding stone 32. In further embodiments, a second grinding funnel 13B may be coupled to the housing 15 and positioned to communicate a foodstuff 400 exiting from between a first grinding stone 31 and a second grinding stone 32 to travel between a third grinding stone 33 and a fourth grinding stone 34.

Optionally, the device 100 may comprise an impeller 28 which may spin, vibrate, or otherwise move to facilitate the movement of a foodstuff 400 into, through, and/or out of a grinding funnel 13. An impeller 28 may be spun, vibrated, or otherwise moved by a grinding motor 14 or other motivator such as which may be used to form a grinding motor 14, positional motivator 24, or roasting motor 21.

Optionally, the device 100 may comprise one or more dispensing nozzles 81, 82, which may be configured to direct the movement or flow of a foodstuff 400 that may be exiting from between two or more grinding stones 31, 32, 33, 34. A dispensing nozzle 81, 82, may be coupled to the housing 15 or other element of the device 100 and may be made in any shape and size.

The device 100 may comprise one or more, and preferably two or more, grinding stones 31, 32, 33, 34, which may be configured to reduce the particle size of a foodstuff 400 that comes into contact with the grinding stones 31, 32, 33, 34. In some embodiments, a device 100 may comprise a first 31 and second 32 grinding stone. In further embodiments, a device 100 may comprise a first 31, second 32, and third 33 grinding stone. In still further embodiments, a device 100 may comprise a first 31, second 32, third 33, and fourth 34 grinding stone. Generally, the terms "first", "second", "third", "fourth", etc., when referring to grinding stones, may simply indicate the positioning of the stone relative to roasting chamber 11 and the other grinding stones 31, 32, 33, 34. For example, a first grinding stone 31 may be positioned closer to the roasting chamber 11 than a second grinding stone 32. Likewise, a third grinding stone 33 and fourth grinding stone 34 may be positioned farther from the roasting chamber 11 than the first 31 and second 32 grinding stones with the fourth grinding stone 34 positioned farthest from the roasting chamber 11.

A grinding stone 31, 32, 33, 34, may comprise one or more grinding interfaces which may function as an abrasive surface and which may be configured to contact and grind a foodstuff 400 in order to reduce the particle size of the foodstuff 400. For example, a first grinding stone 31 may comprise a first grinding interface 41, a second grinding stone 32 may comprise a second grinding interface 42, a third grinding stone 33 may comprise a third grinding interface 43, and a fourth grinding stone 34 may comprise a fourth grinding interface 44. When referring to grinding interfaces, the terms "first", "second", "third", "fourth", etc., simply differentiate one grinding interface from another grinding interface. For example, a first grinding stone 31 may comprise a first grinding interface 41 and a second grinding stone 32 may comprise a second grinding interface 42 and a third grinding interface 43. To further differentiate grinding surfaces on a grinding stone having two or more grinding surfaces, the terms "upper" and "lower" may be used. For example, a second grinding stone 32 having two grinding interfaces may have an upper grinding interface 51 and a lower grinding interface 61 with the upper grinding interface 51 positioned closer to the roasting chamber 11 than the lower grinding interface 61.

Each grinding interface 41, 42, 43, 44, 51, 61, may comprise a grind texturing 29 which may comprise one or more protrusions and/or depressions that may contact the foodstuff 400 and abrade the foodstuff 400 to reduce the particle size of the foodstuff 400 to a ground foodstuff viscosity and smoothness as desired by a user. For example, a foodstuff 400 having a pre-ground particle size, such as whole (not previously ground) sesame seeds, may be passed between a first 31 and second 32 grinding stones so that the grind texturing 29 of the grinding stones 31, 32, may abrade the foodstuff 400 to reduce the particle size of the foodstuff 400 to a first ground particle size, such that the sesame seeds are broken down to approximately two percent of their original, unbroken seed size. Continuing the above example, a sesame foodstuff 400 having a first ground particle size of approximately two percent of the original, unbroken seed size, may be passed between a third 33 and fourth 34 grinding stones so that the grind texturing 29 of the grinding stones 33, 34, may abrade the foodstuff 400 to reduce the particle size of the foodstuff 400 to a second ground particle size, such that the sesame seeds are broken down to approximately 0.02 percent of their original, unbroken size. The protrusions and/or depressions of the grind texturing 29 may be configured according to known grinding surface texturing methods.

A grinding interface 41, 42, 43, 44, 51, 61, of a grinding stone 31, 32, 33, 34, may be made from or may comprise any material(s) which may be suitable for contacting and grinding a foodstuff 400 to reduce the particle size of the foodstuff 400. For example, a grinding interface 41, 42, 43, 44, 51, 61, may be made from or may comprise stainless steel, zinc alloy, carbon steel, ceramic, and hard plastics, such as acrylic.

In some embodiments, two or more grinding stones 31, 32, 33, 34, may be positioned so that the grinding interfaces 41, 42, 43, 44, 51, 61, of the grinding stones 31, 32, 33, 34, may function as a burr mill or burr grinder so that the foodstuff 400 may be ground and reduced in particle size between the abrasive grinding interfaces 41, 42, 43, 44, 51, 61, of the grinding stones 31, 32, 33, 34. Preferably, grinding stones 31, 32, 33, 34, may comprise a grinding stone aperture 30 which may be used to align the stones 31, 32, 33, 34, and which may provide an axis of rotation that one or more of the stones 31, 32, 33, 34, may revolve around.

Figure 12:
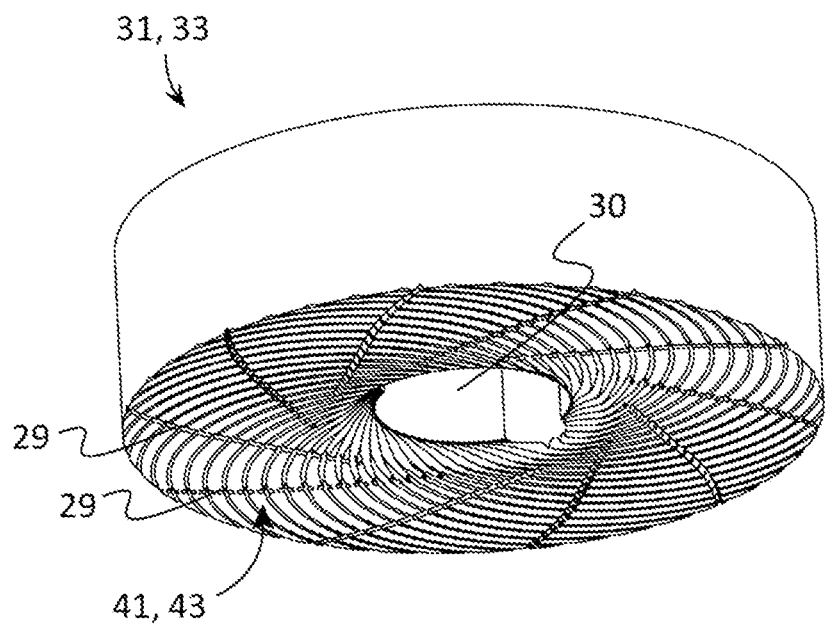
FIG. 12 shows a bottom perspective view of an example of a grinding stone, such as which may be used with the example grinding stone of FIG. 13, according to various embodiments described herein.
Figure 13:
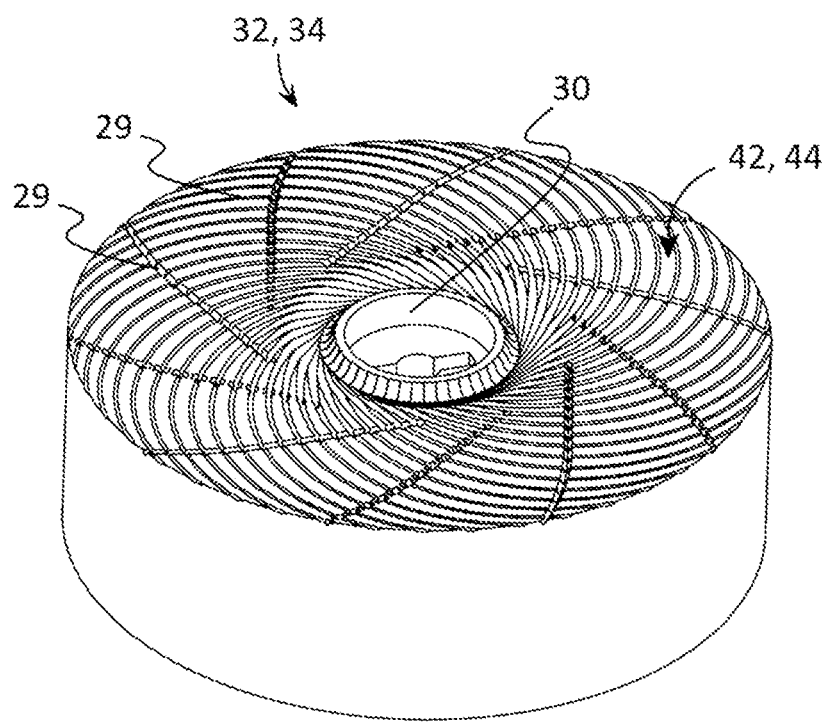
FIG. 13 depicts a top perspective view of another example of a grinding stone, such as which may be used with the example grinding stone of FIG. 12, according to various embodiments described herein.
Figure 14:
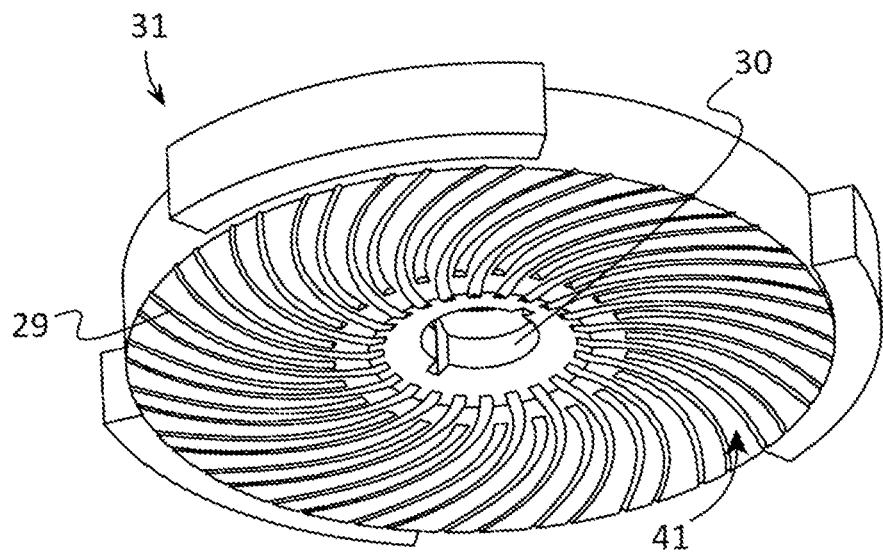
FIG. 14 illustrates a bottom perspective view of yet another example of a grinding stone, such as which may be used with the example grinding stones of FIGS. 15 and 16, according to various embodiments described herein.
Figure 15:
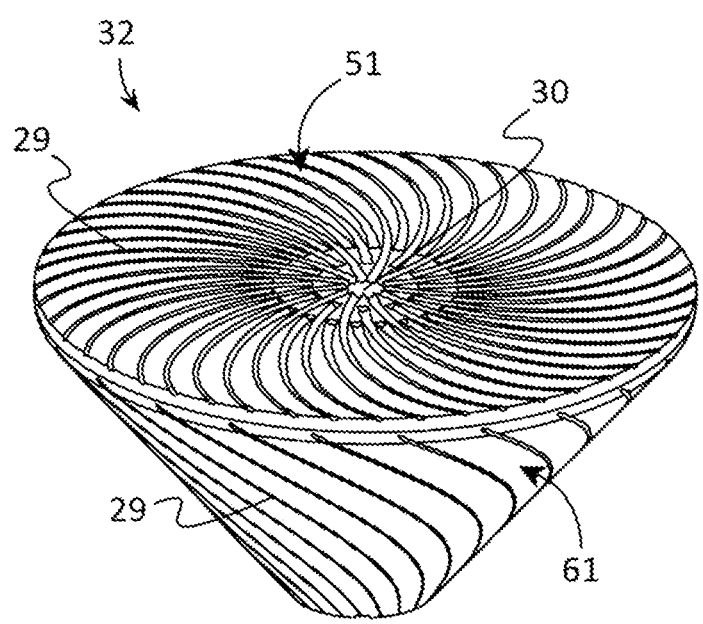
FIG. 15 shows a top perspective view of still another example of a grinding stone, such as which may be used with and positioned between the example grinding stones of FIGS. 14 and 16, according to various embodiments described herein.
Figure 16:
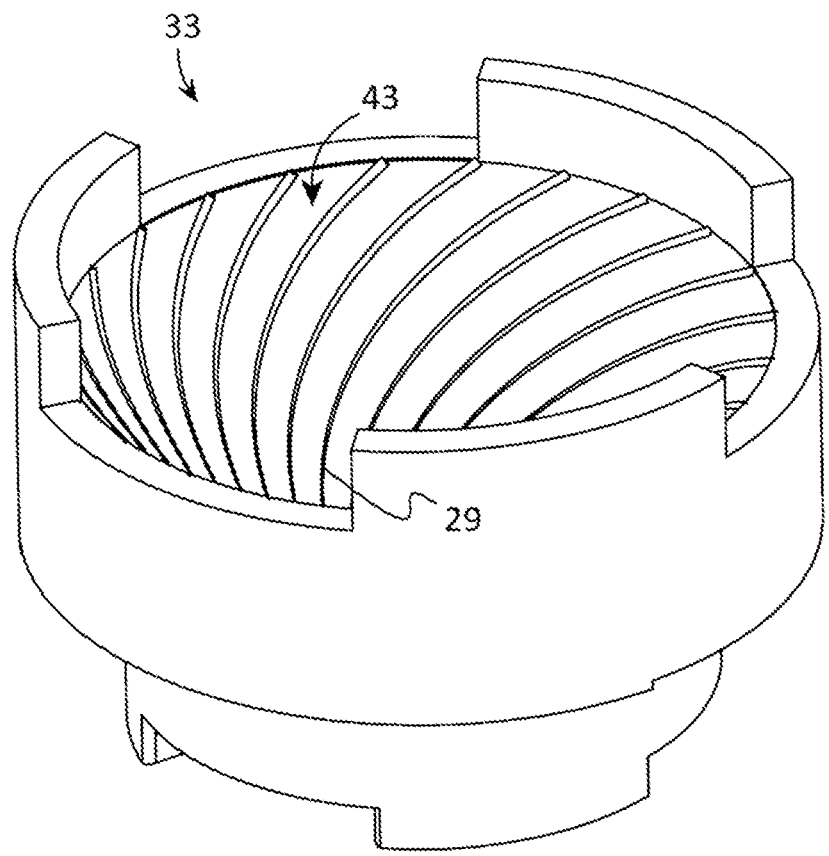
FIG. 16 depicts a top perspective view of still yet another example of a grinding stone, such as which may be used with the example grinding stones of FIGS. 14 and 15, according to various embodiments described herein.

FIGS. 12-16 illustrate examples of grinding stones 31, 32, 33, 34, according to various embodiments. To facilitate describing various embodiments of the grinding stones 31, 32, 33, 34, FIG. 12 illustrates an example of a first 31 and/or third 33 grinding stone, FIG. 13 illustrates an example of a second 32 and/or fourth 34 grinding stone, FIG. 14 illustrates another example of a first grinding stone 13, FIG. 15 illustrates another example of a second grinding stone 32, and FIG. 16 illustrates an example of a third grinding stone 33. However, it should be understood that any grinding stone 31, 32, 33, 34, may be configured as any other grinding stone 31, 32, 33, 34, such that the terms "first", "second", "third", "fourth", etc., simply differentiate one grinding stone from another grinding stone.

In some embodiments, and as shown in FIGS. 3, 5, 8, 10, and 12-15, a grinding stone 31, 32, may comprise a grinding interface 41, 42, 51, that may be planar or flat in shape. As an example and referring to FIGS. 12 and 13, a first grinding stone 31 and second grinding stone 32 may be positioned within the device 100 so that the planar shaped first grinding interface 41 and planar shaped second grinding interface 42 may crush and grind a foodstuff 400 passing between the grinding interfaces 41, 42. As another example and referring to FIGS. 14 and 15, a first grinding stone 31 and second grinding stone 32 may be positioned within the device 100 so that the planar shaped first grinding interface 41 and planar shaped upper grinding interface 51 may crush and grind a foodstuff 400 passing between the grinding interfaces 41, 51.

In further embodiments, and as shown in FIGS. 15 and 16, a grinding stone 32, 33, may comprise a grinding interface 43, 61, that may be curved in shape. In some embodiments, a curved shape may comprise a 3D curved shape, such as a full or partial curved shape of a sphere, other spheroid, a 2D curved shape, such as a full or partial curved shape of a cylinder, cone, or any other curved shape (not planar or flat)

including combinations of curved shapes. In some preferred embodiments, a second 32 and third 33 grinding stone may each comprise a grinding interface 61, 43, that may be curved in shape by being conical in shape (cone-shaped).

Figure 2:
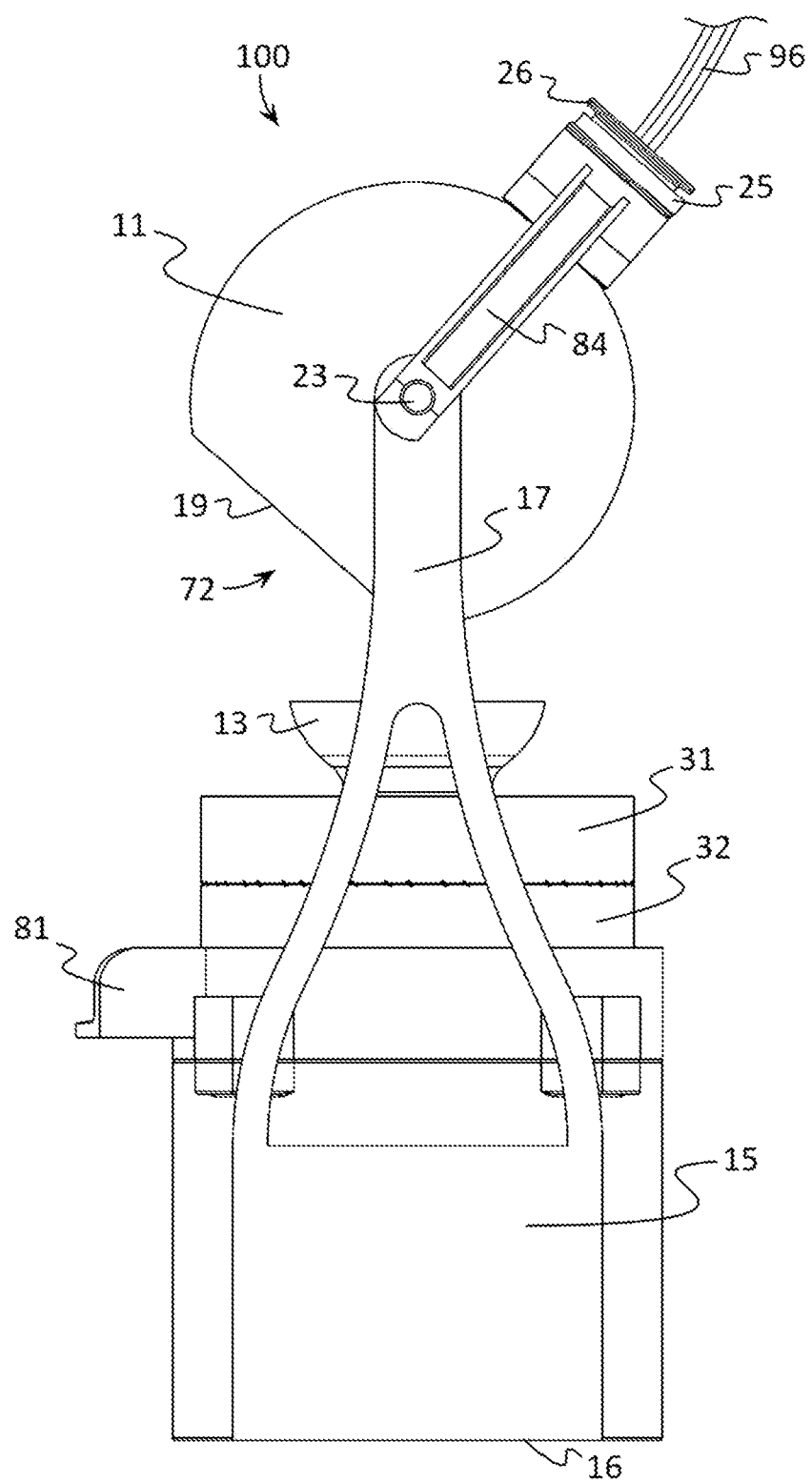
FIG. 2 illustrates a side elevation view of an example of a foodstuff preparation device according to various embodiments described herein.
Figure 3:
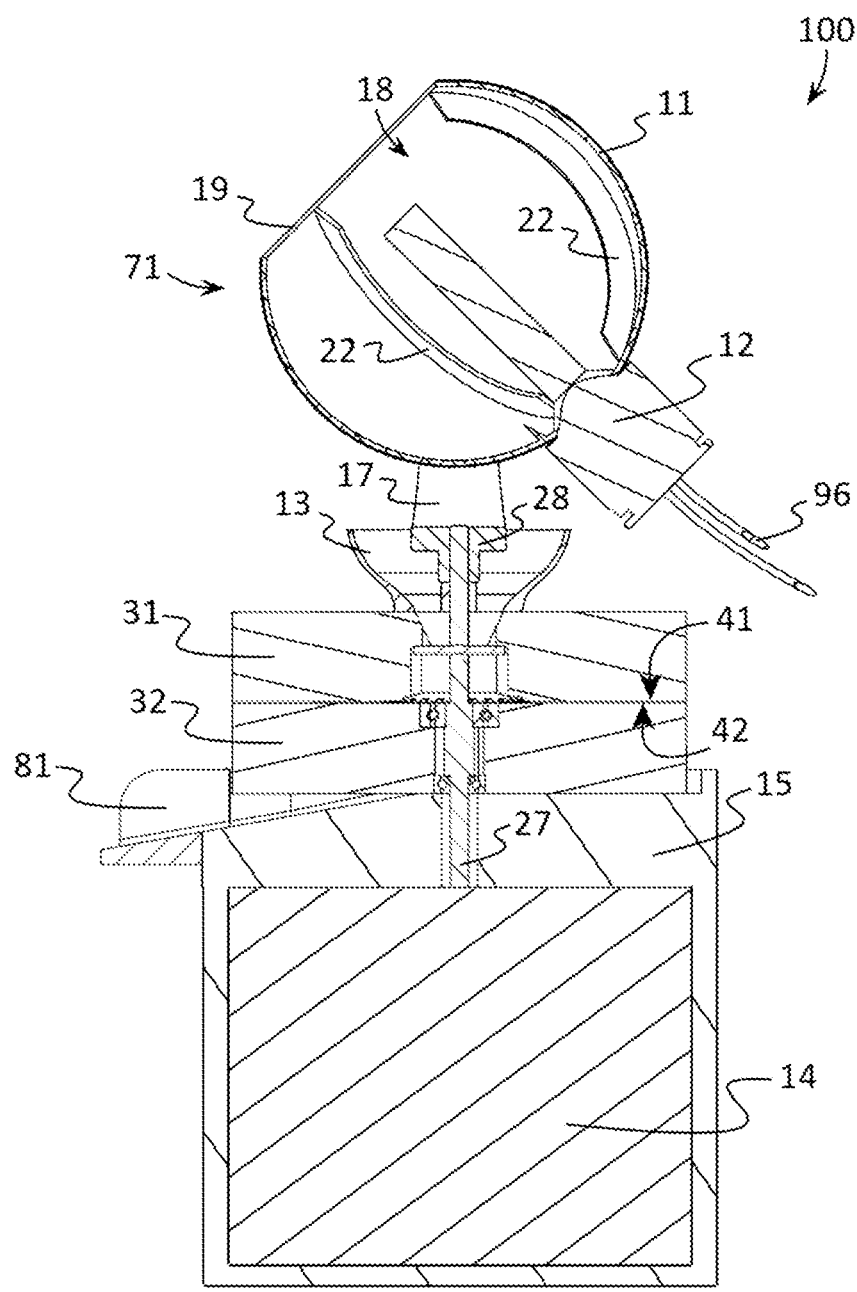
FIG. 3 shows a sectional elevation view of an example of a foodstuff preparation device according to various embodiments described herein.

Turning now to FIGS. 1-3 an example of a device 100 is depicted. In this and some embodiments, the device 100 may comprise a roasting chamber 11 having a generally spherical shaped roasting cavity 18, and a heating element 12 may be configured to govern the temperature of the roasting cavity 18 so as to heat and/or cool the roasting cavity 18. A first grinding stone 31 and a second grinding stone 32 may be coupled to a housing 15 and positioned below the roasting chamber 11. A grinding funnel 13 may be positioned above the first 31 and second 32 grinding stones, and the grinding funnel 13 may be configured for communicating a foodstuff 400, having a pre-ground particle size, between the first grinding stone 31 and second grinding stone 32 from the roasting chamber 11. A grinding motor 14 may be configured to motivate the foodstuff 400 between the planar shaped grinding interface 41 of the first grinding stone 31 and planar shaped grinding interface 42 of the second grinding stone 32, by rotating the first 31 and/or second 32 grinding stone so that the foodstuff 400 exits from between the first grinding stone 31 and second grinding stone 32 with a first ground particle size that is smaller than the pre-ground particle size. A first dispensing nozzle 81 may direct the movement of the foodstuff 400 to exit the device 100 into a desired container or the like.

Figure 4:
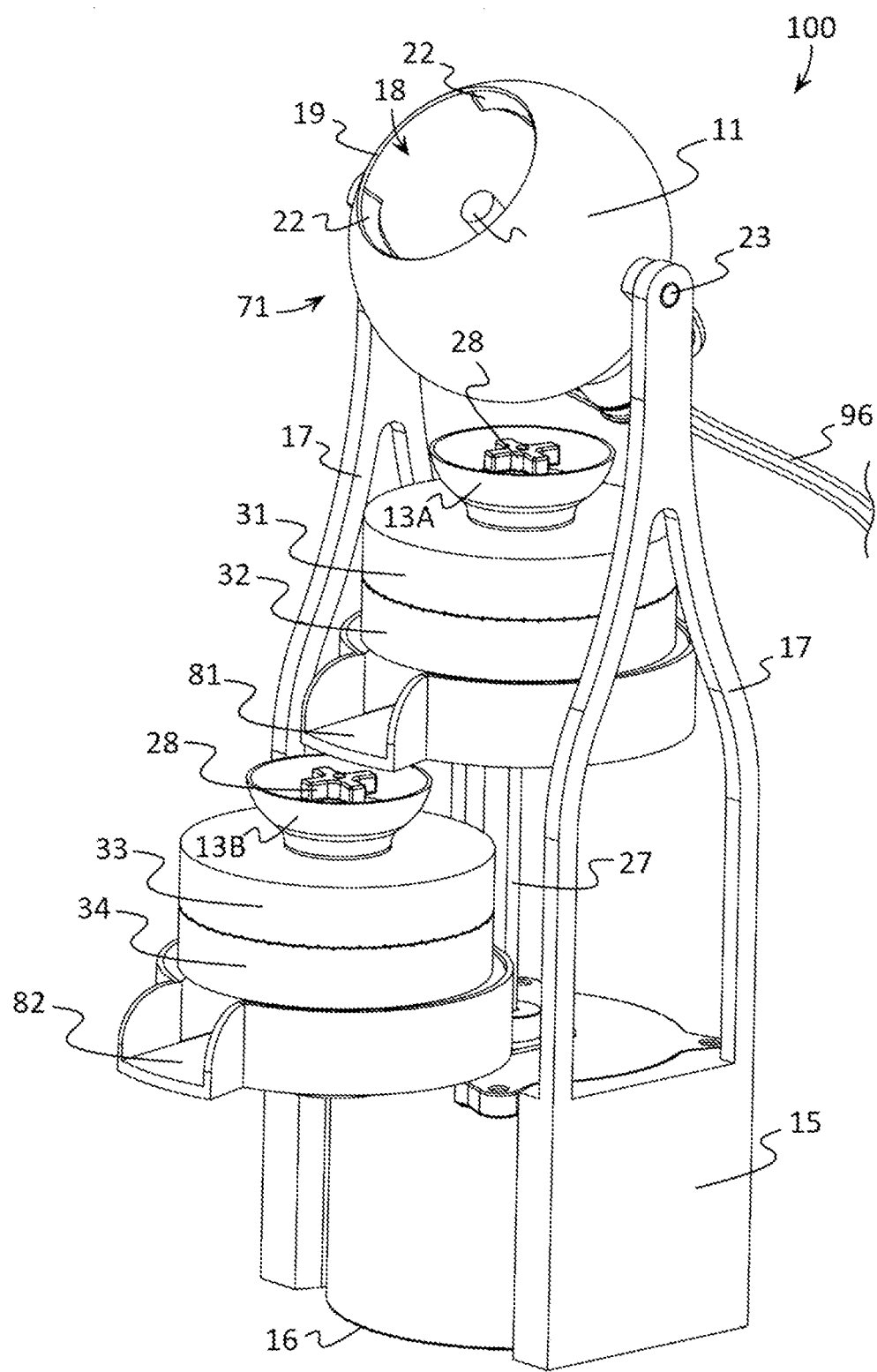
FIG. 4 depicts a perspective view of another example of a foodstuff preparation device according to various embodiments described herein.
Figure 5:
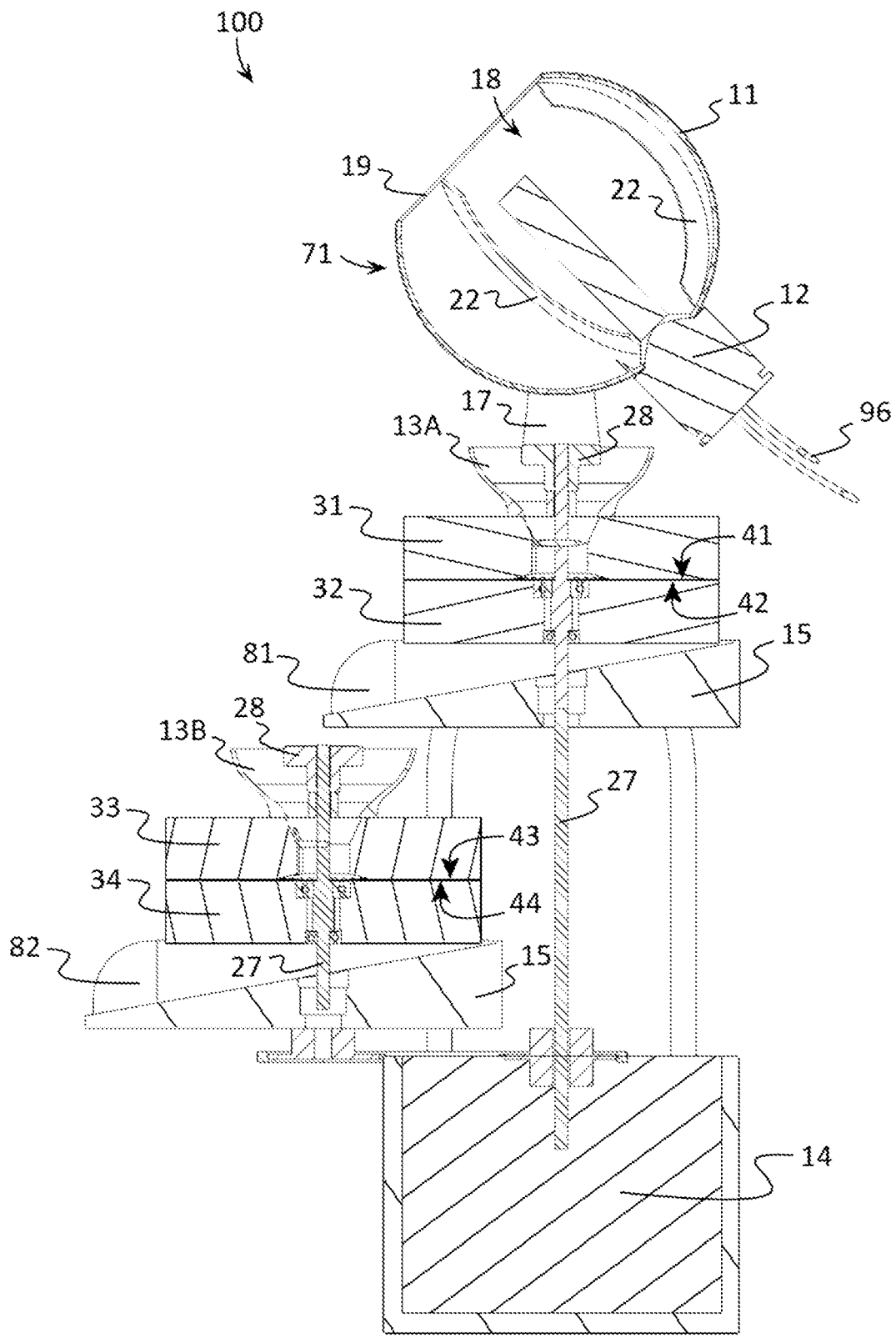
FIG. 5 illustrates a sectional elevation view of another example of a foodstuff preparation device according to various embodiments described herein.

FIGS. 4 and 5 show another example of a device 100. In this and some embodiments, the device 100 may comprise a roasting chamber 11 having a generally spherical shaped roasting cavity 18, and a heating element 12 may be configured to govern the temperature of the roasting cavity 18 so as to heat and/or cool the roasting cavity 18. A first grinding stone 31, a second grinding stone 32, a third grinding stone 33, and a fourth grinding stone 34, may be coupled to a housing 15 and positioned below the roasting chamber 11. A grinding funnel 13 may be positioned above the first 31 and second 32 grinding stones, and the grinding funnel 13 may be configured for communicating a foodstuff 400, having a pre-ground particle size, between the first grinding stone 31 and second grinding stone 32 from the roasting chamber 11. A grinding motor 14 may be configured to motivate the foodstuff 400 between the planar shaped grinding interface 41 of the first grinding stone 31 and planar shaped grinding interface 42 of the second grinding stone 32 by rotating the first 31 and/or second 32 grinding stone so that the foodstuff 400 exits from between the first grinding stone 31 and second grinding stone 32 with a first ground particle size that is smaller than the pre-ground particle size. A first dispensing nozzle 81 may direct the movement of the foodstuff 400 into a second grinding funnel 13 which may be positioned above a third 33 and a fourth 34 grinding stones, and which may communicate the foodstuff 400 between the third 33 and a fourth 34 grinding stones. A grinding motor 14 may be configured to motivate the foodstuff 400 between the planar shaped grinding interface 43 of the third grinding stone 33 and the planar shaped fourth grinding interface 44 of the fourth grinding stone 34, by rotating the third 33 and/or fourth 34 grinding stone so that the foodstuff 400 exits from between the third grinding stone 33 and fourth grinding stone 34 with a second ground particle size that is smaller than the first ground particle size. A second dispensing nozzle 82 may direct the movement of the foodstuff 400 to exit the device 100 into a desired container or the like.

Figure 6:
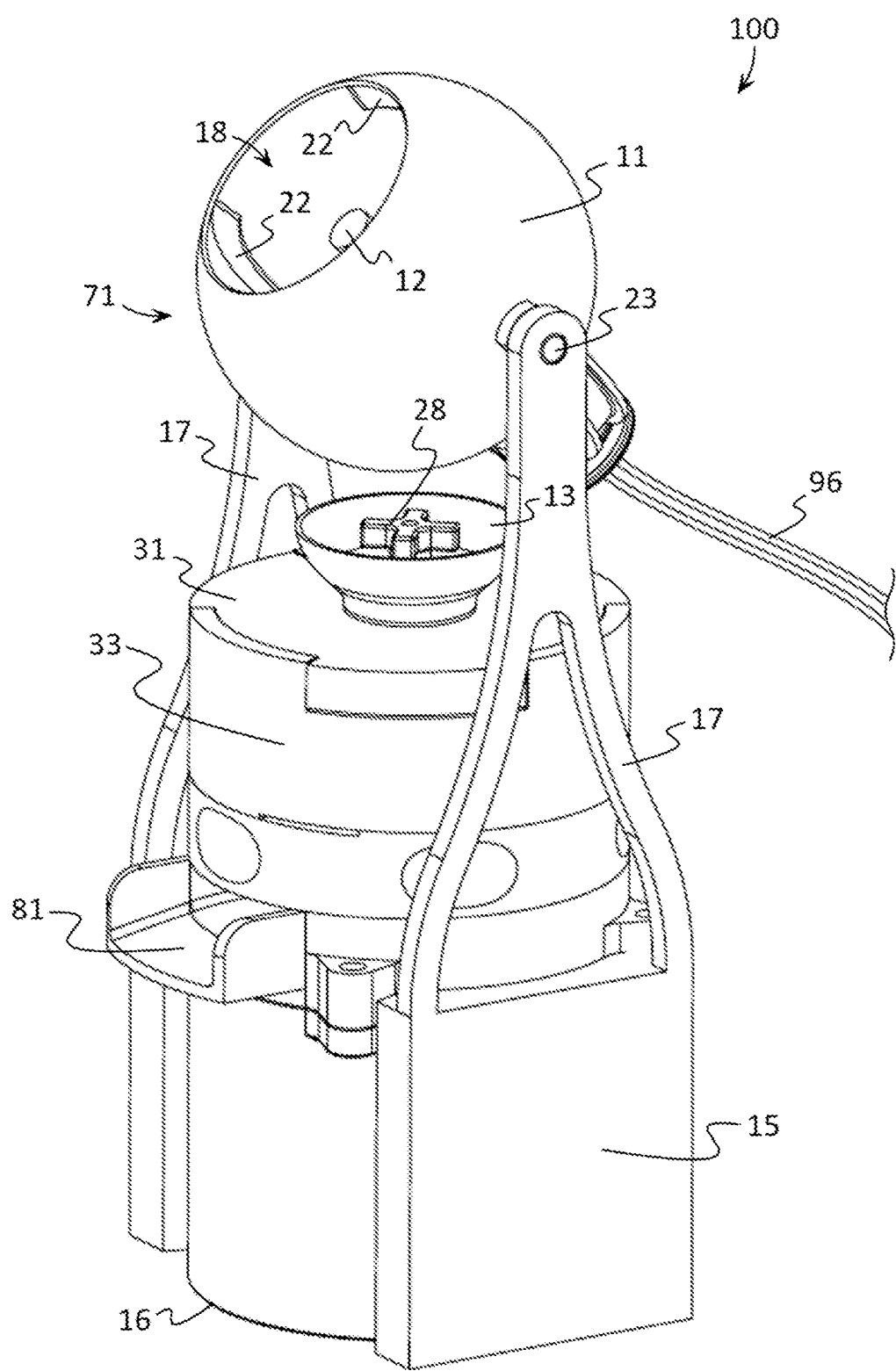
FIG. 6 shows a perspective view of still another example of a foodstuff preparation device having a roasting chamber in a first position according to various embodiments described herein.
Figure 7:
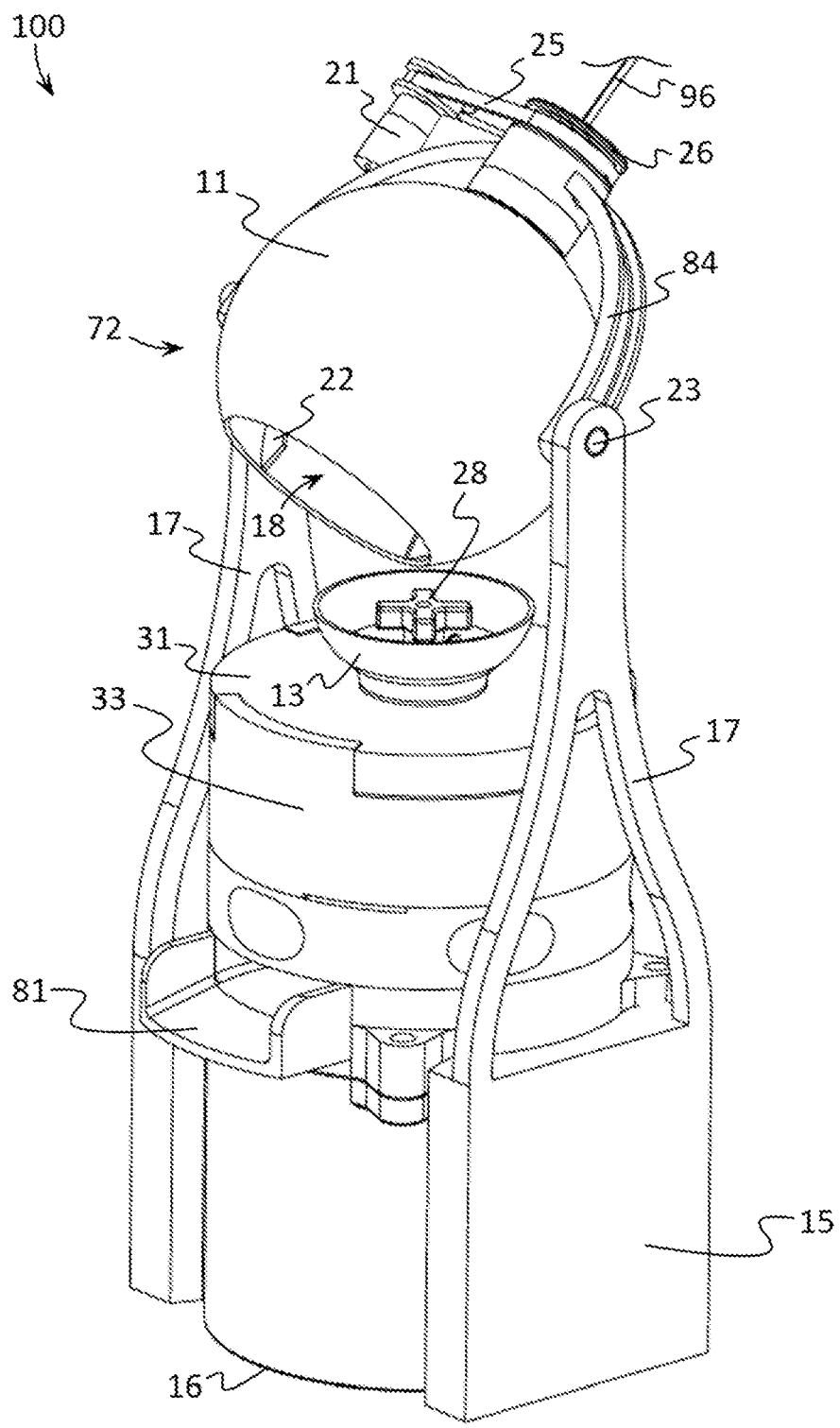
FIG. 7 depicts a perspective view of still another example of a foodstuff preparation device having a roasting chamber in a second position according to various embodiments described herein.

FIGS. 6-8 illustrate a further example of a device 100. In this and some embodiments, the device 100 may comprise a roasting chamber 11 having a generally spherical shaped roasting cavity 18, and a heating element 12 may be configured to govern the temperature of the roasting cavity 18 so as to heat and/or cool the roasting cavity 18. A first grinding stone 31, a second grinding stone 32, and a third grinding stone 33 may be coupled to a housing 15 and positioned below the roasting chamber 11. A grinding funnel 13 may be positioned above the first 31 and second 32 grinding stones, and the grinding funnel 13 may be configured for communicating a foodstuff 400, having a pre-ground particle size, between the first grinding stone 31 and second grinding stone 32 from the roasting chamber 11. A grinding motor 14 may be configured to motivate the foodstuff 400 between the planar shaped grinding interface 41 of the first grinding stone 31 and planar shaped upper grinding interface 51 of the second grinding stone 32 by rotating the first 31 and/or second 32 grinding stone so that the foodstuff 400 exits from between the first grinding stone 31 and second grinding stone 32 with a first ground particle size that is smaller than the pre-ground particle size. The grinding motor 14 may further motivate the foodstuff 400 between the curved shaped lower grinding interface 61 of the second grinding stone 32 and the curved shaped third grinding interface 43 of the third grinding stone 33, by rotating the second 32 and/or third 33 grinding stone so that the foodstuff 400 exits from between the second grinding stone 32 and third grinding stone 33 with a second ground particle size that is smaller than the first ground particle size. A first dispensing nozzle 81 may direct the movement of the foodstuff 400 to exit the device 100 into a desired container or the like.

FIGS. 9 and 10 show still a further example of a device 100. In this and some embodiments, the device 100 may comprise a roasting chamber 11 having a generally cylindrical shaped roasting cavity 18, and a heating element 12 may be configured to govern the temperature of the roasting cavity 18 so as to heat and/or cool the roasting cavity 18. A first grinding stone 31 and a second grinding stone 32 may be coupled to a housing 15 and positioned below the roasting chamber 11. A grinding funnel 13 may be positioned above the first 31 and second 32 grinding stones, and the grinding funnel 13 may be configured for communicating a foodstuff 400, having a pre-ground particle size, between the first grinding stone 31 and second grinding stone 32 from the roasting chamber 11. A grinding motor 14 may be configured to motivate the foodstuff 400 between the planar shaped grinding interface 41 of the first grinding stone 31 and planar shaped grinding interface 42 of the second grinding stone 32, by rotating the first 31 and/or second 32 grinding stone so that the foodstuff 400 exits from between the first grinding stone 31 and second grinding stone 32 with a first ground particle size that is smaller than the pre-ground particle size. A first dispensing nozzle 81 may direct the movement of the foodstuff 400 to exit the device 100 into a desired container or the like.

FIG. 11 depicts a sectional view of yet a further example of a device 100. In this and some embodiments, the device 100 may comprise a roasting chamber 11 having a generally spherical shaped roasting cavity 18, and a heating element 12 may be configured to govern the temperature of the roasting cavity 18 so as to heat and/or cool the roasting cavity 18. A first grinding stone 31 and a second grinding stone 32 may be coupled to a housing 15 and positioned below the roasting chamber 11. A grinding funnel 13 may be positioned above the first 31 and second 32 grinding stones, and the grinding funnel 13 may be configured for communicating a foodstuff 400, having a pre-ground particle size, between the first grinding stone 31 and second grinding stone 32 from the roasting chamber 11. A grinding motor 14 may be configured to motivate the foodstuff 400 between the curved shaped grinding interface 41 of the first grinding stone 31 and curved shaped grinding interface 42 of the second grinding stone 32, by rotating the first 31 and/or second 32 grinding stone so that the foodstuff 400 exits from between the first grinding stone 31 and second grinding stone 32 with a first ground particle size that is smaller than the pre-ground particle size. A first dispensing nozzle 81 may direct the movement of the foodstuff 400 to exit the device 100 into a desired container or the like.

Referring now to the example devices 100 illustrated in FIGS. 17-23, in some embodiments, the device 100 may comprise a grinding funnel 13 which may be configured to communicate a foodstuff 400, having a pre-ground particle size, between a first grinding stone 31 and a second grinding stone 32. A dispensing funnel 35 may be positioned above the grinding funnel 13, and the dispensing funnel 35 may be configured to communicate the foodstuff 400, having a pre-ground particle size, into the grinding funnel 13. A grinding motor 14 may be configured to motivate the foodstuff 400 between the first grinding stone 31 and second grinding stone 32 so that the foodstuff 400 exits from between the first grinding stone 31 and second grinding stone 32 with a first ground particle size, the first ground particle size smaller than the pre-ground particle size.

A dispensing funnel 35 may be configured in any size and shape. In some embodiments, a dispensing funnel 35 may comprise a dispensing aperture 36 which may allow and direct a foodstuff 400 exiting the dispensing funnel 35 to be communicated into a grinding funnel 13. In further embodiments, a foodstuff 400 exiting the dispensing funnel 35 via a dispensing aperture 36 may be communicated between a first grinding stone 31 and a second grinding stone 32 without the use of a grinding funnel 13. Preferably, a dispensing funnel 35 may be wider or larger on a receiving or upper end of the dispensing funnel 35 and narrower or smaller on an exiting or lower end, proximate to the dispensing aperture 36, of the dispensing funnel 35.

A dispensing funnel 35 may be coupled to the housing 15 via one or more chamber supports 17 which may position the dispensing funnel 35 above the one or more grinding stones 31, 32, 33, 34. Optionally, a dispensing funnel 35 may be movably coupled to a chamber support 17 or other element of the device 100 via a pivotal coupling 23 or a dispensing funnel 35 may be generally non-movably coupled to a chamber support 17 or other element of the device 100 via any other suitable coupling method.

In some embodiments, the device 100 may comprise a dispensing valve 37 that is configured to control the communication of a foodstuff 400, having a pre-ground particle size, from the dispensing funnel 36 into a grinding funnel 13 or between the first grinding stone 31 and second grinding stone 32. A dispensing valve 37 may be configured in any shape and size. Preferably, a dispensing valve 37 may comprise a disc shape or other shape that is complementary to the sectional shape of the dispensing funnel 35 so that when the dispensing valve 37 is generally parallel to the dispensing aperture 36, foodstuff 400 within the dispensing funnel 35 may be prevented from exiting the dispensing funnel 35 via the dispensing aperture 36, and when the dispensing valve 37 is generally not parallel to the dispensing aperture 36, foodstuff 400 within the dispensing funnel 35 may be allowed to exit the dispensing funnel 35 via the dispensing aperture 36. In some embodiments, a dispensing valve 37 may be moved to block or allow foodstuff 400 to exit a dispensing aperture 36 via a valve handle 38 which may be manually manipulated by a user. In further embodiments, a dispensing valve 37 may be moved to block or allow foodstuff 400 to exit a dispensing aperture 36 via a motor, solenoid, actuator, or other device which may allow the user to control the release of foodstuff 400 from the dispensing funnel 35 in a handsfree manner.

Generally, a dispensing valve 37 may enable, disable, or otherwise modulate the flow of a foodstuff 400 out of a dispensing funnel 35. A dispensing valve 37 may comprise or include a flow control valve, pressure regulating valve, relief valve, ball valve, a gate valve, butterfly valve, diaphragm valve, needle valve, globe valve, check valve, pressure balanced valve, locking valve, solenoid valve, or any other type of valve or controller which may be used to enable, disable, or otherwise modulate the flow of modulate the flow of a foodstuff 400 out of a dispensing funnel 35.

Figure 17:
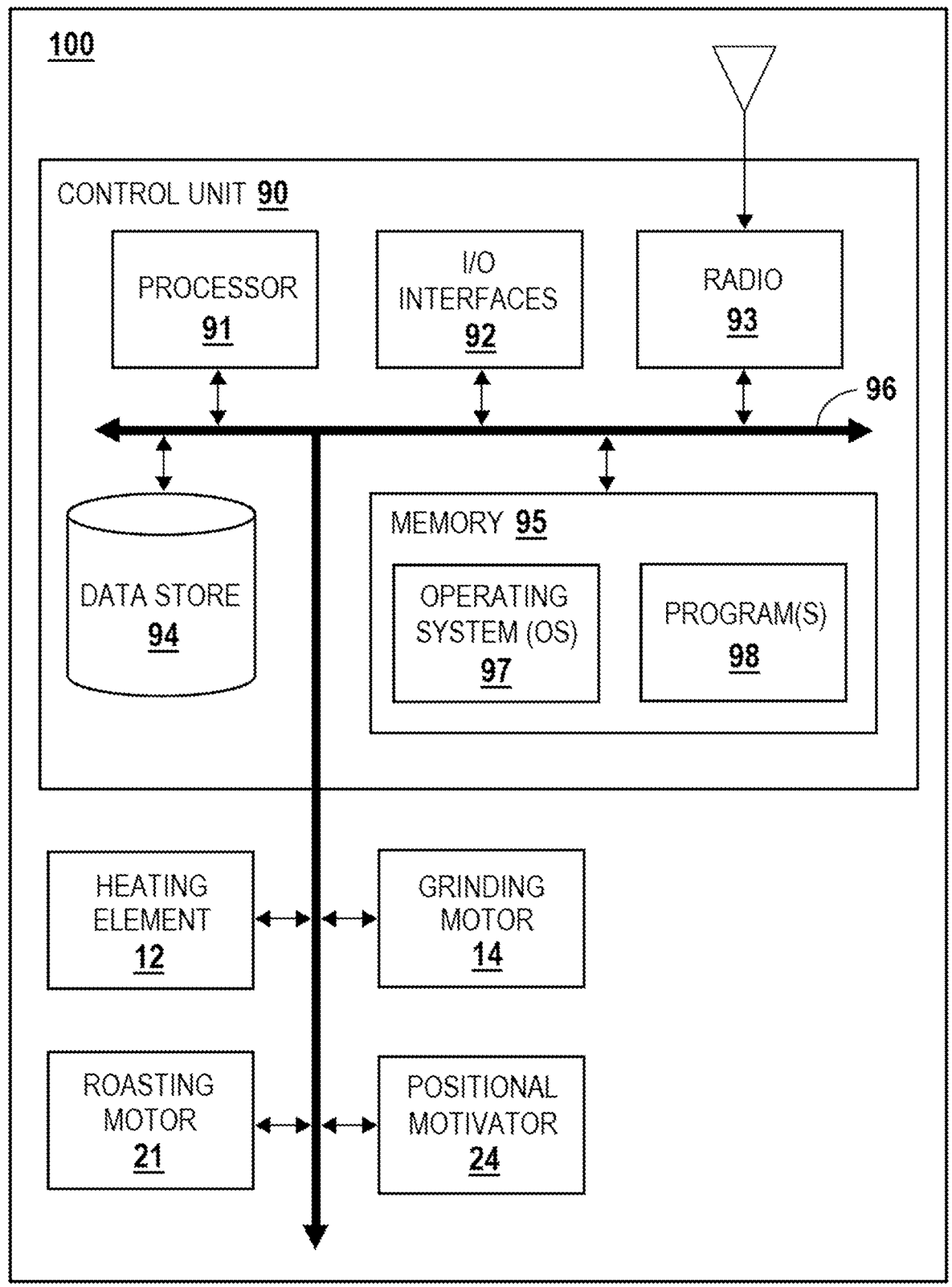
FIG. 17 illustrates a block diagram showing some optional elements of an example foodstuff preparation device according to various embodiments described herein.
Figure 18:
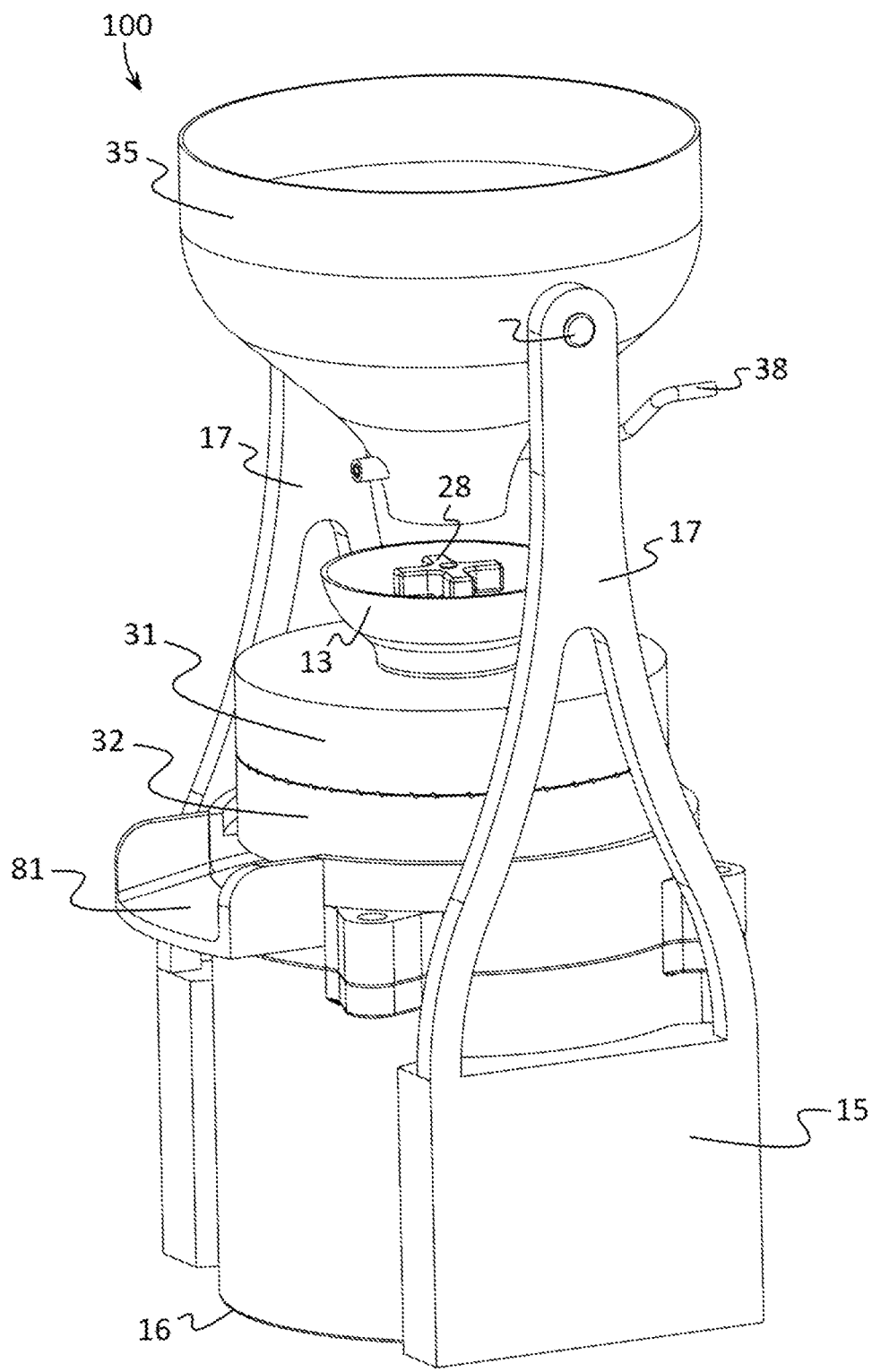
FIG. 18 depicts a perspective view of a further example of a foodstuff preparation device having a dispensing funnel according to various embodiments described herein.
Figure 19:
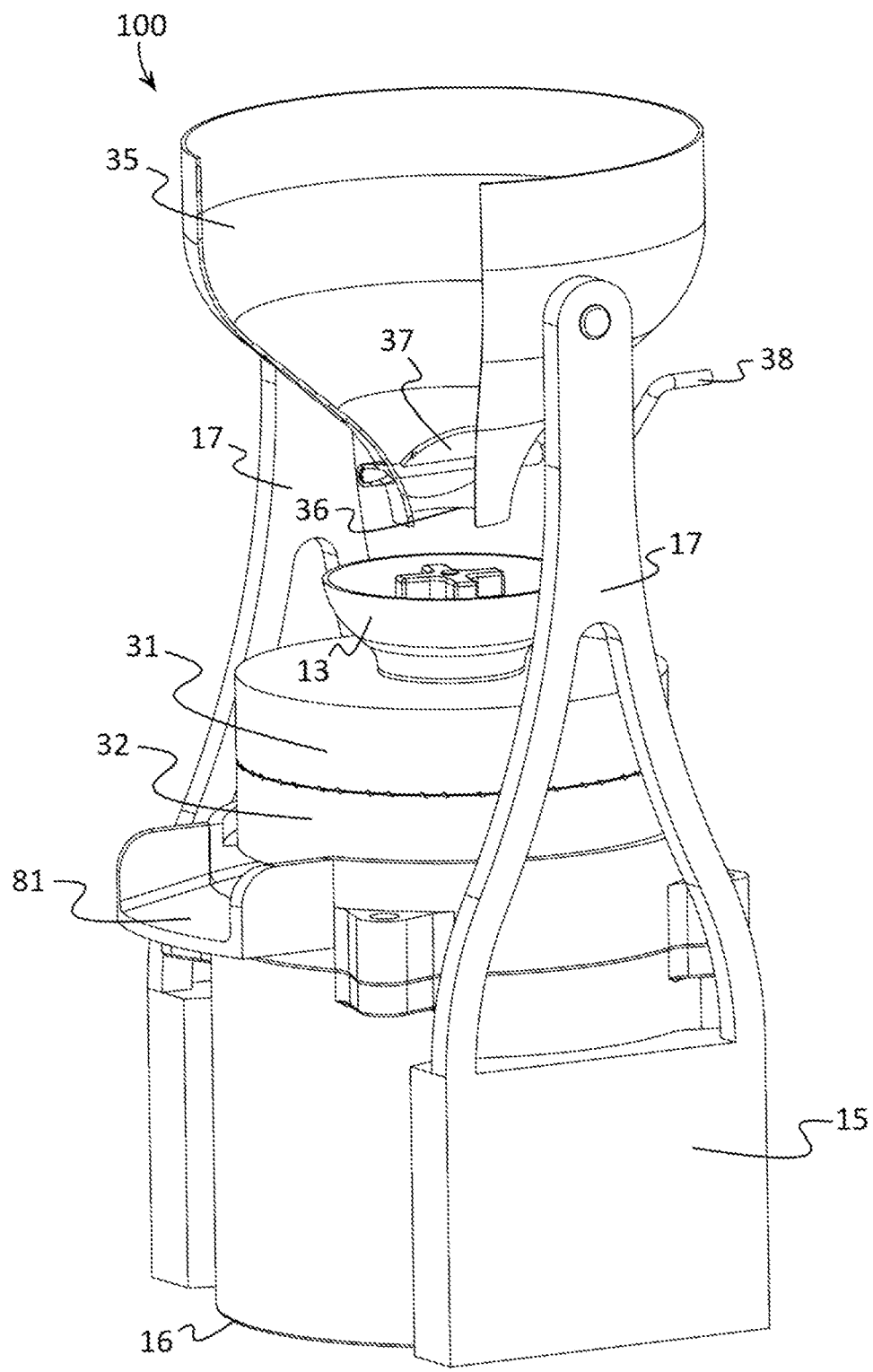
FIG. 19 shows a perspective view of the example foodstuff preparation device of FIG. 18 with a sectional view of the dispensing funnel according to various embodiments described herein.
Figure 20:
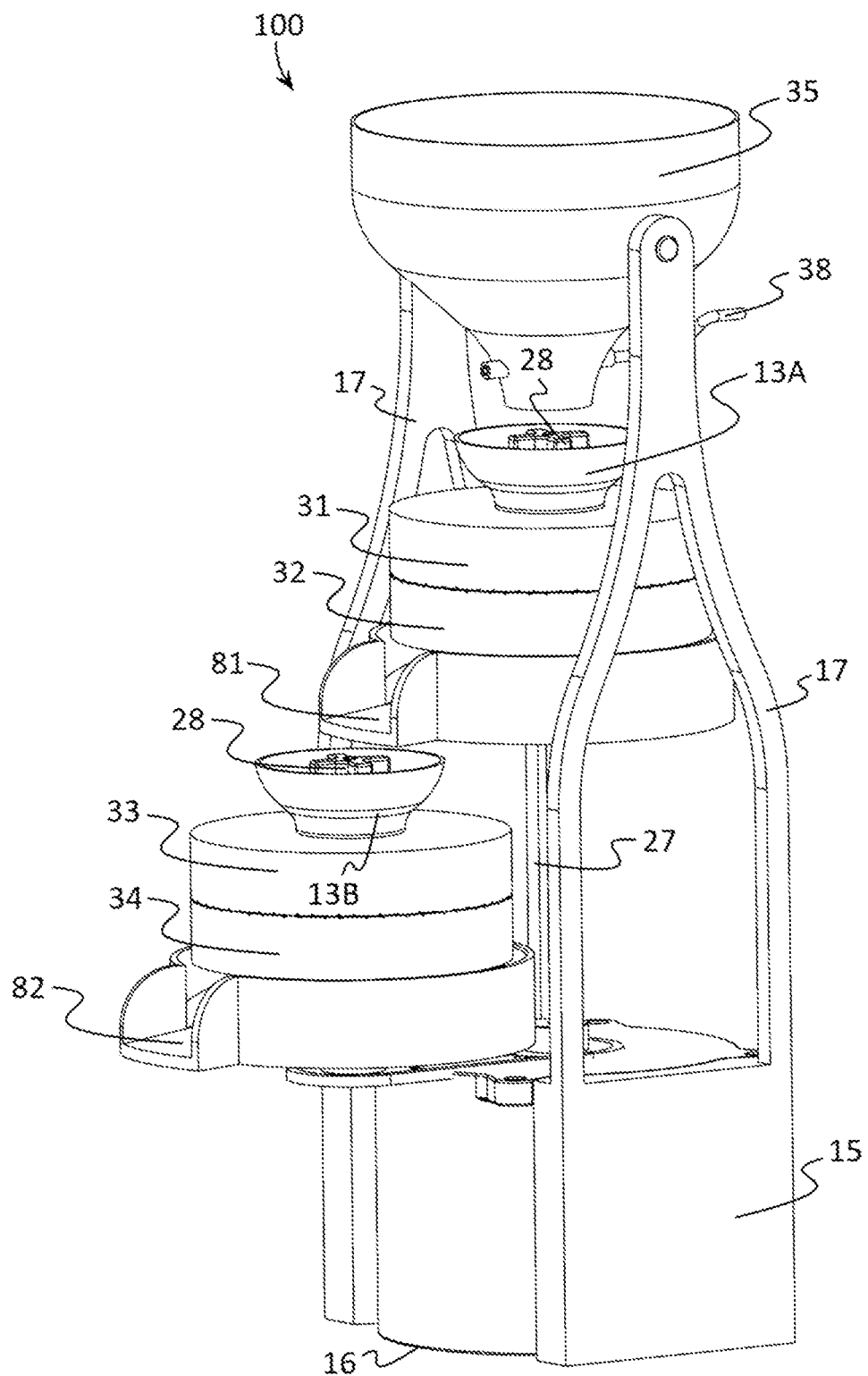
FIG. 20 depicts a perspective view of yet a further example of a foodstuff preparation device having a dispensing funnel according to various embodiments described herein.
Figure 21:
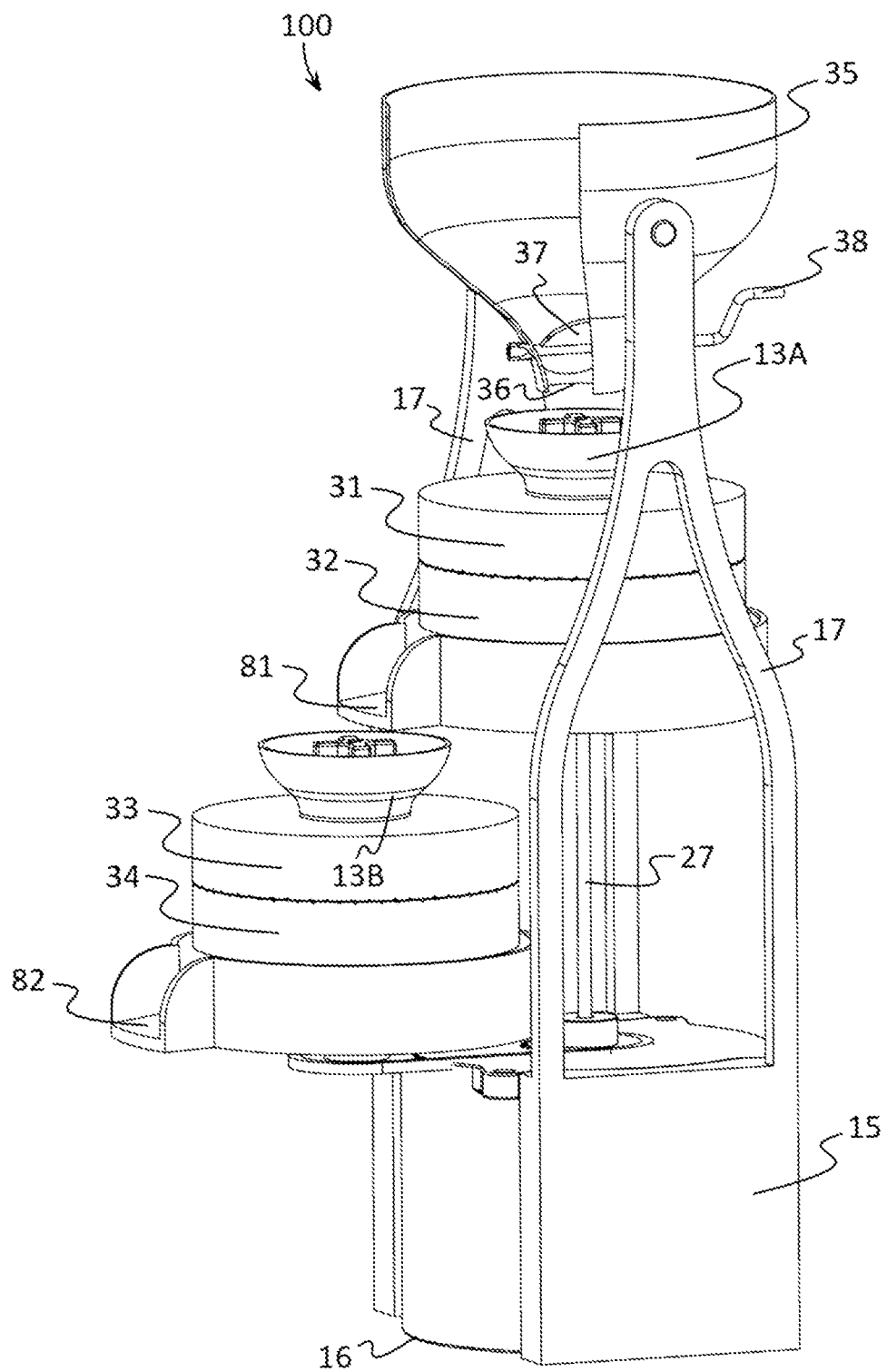
FIG. 21 shows a perspective view of the example foodstuff preparation device of FIG. 20 with a sectional view of the dispensing funnel according to various embodiments described herein.
Figure 22:
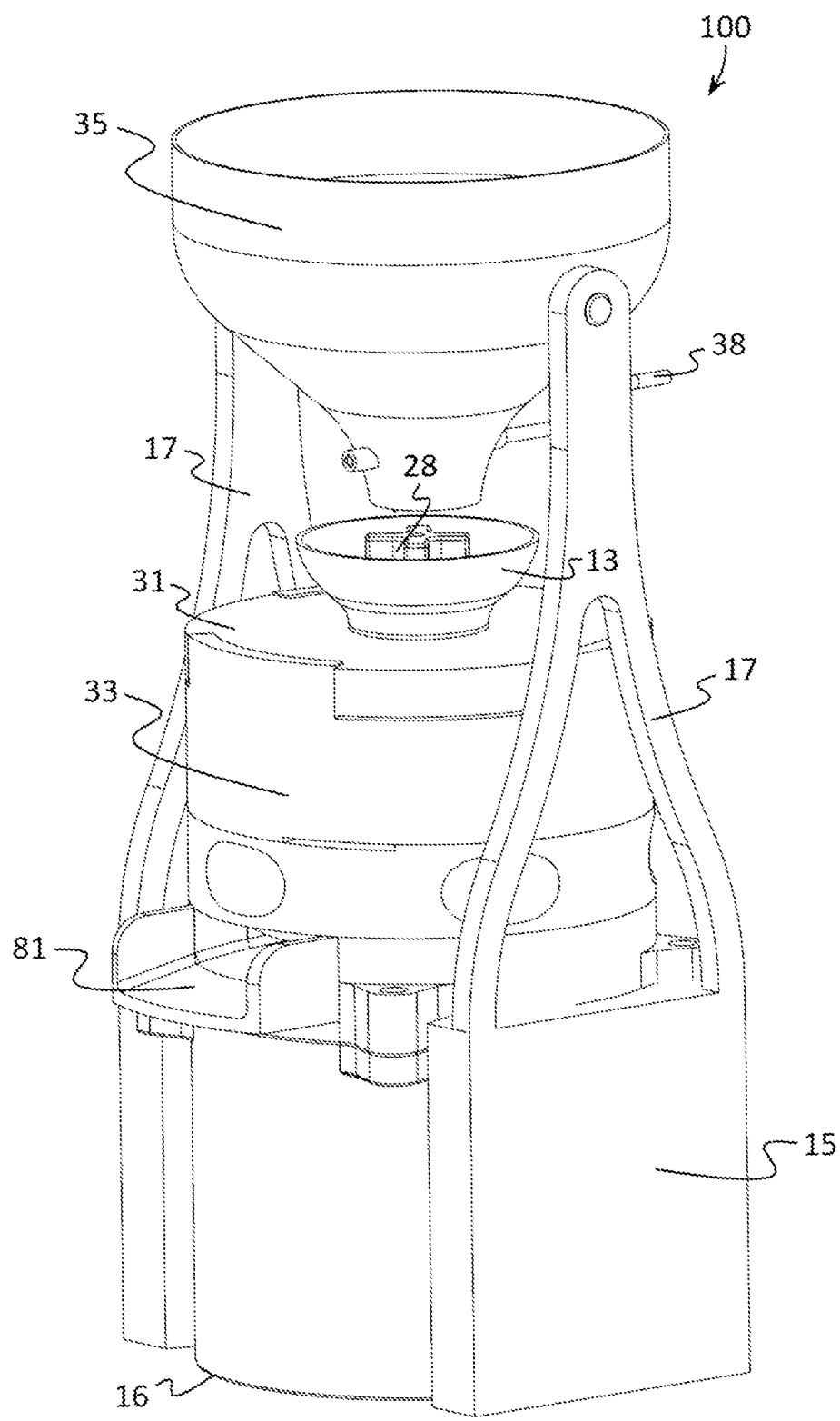
FIG. 22 depicts a perspective view of a further example of a foodstuff preparation device having a dispensing funnel according to various embodiments described herein.
Figure 23:
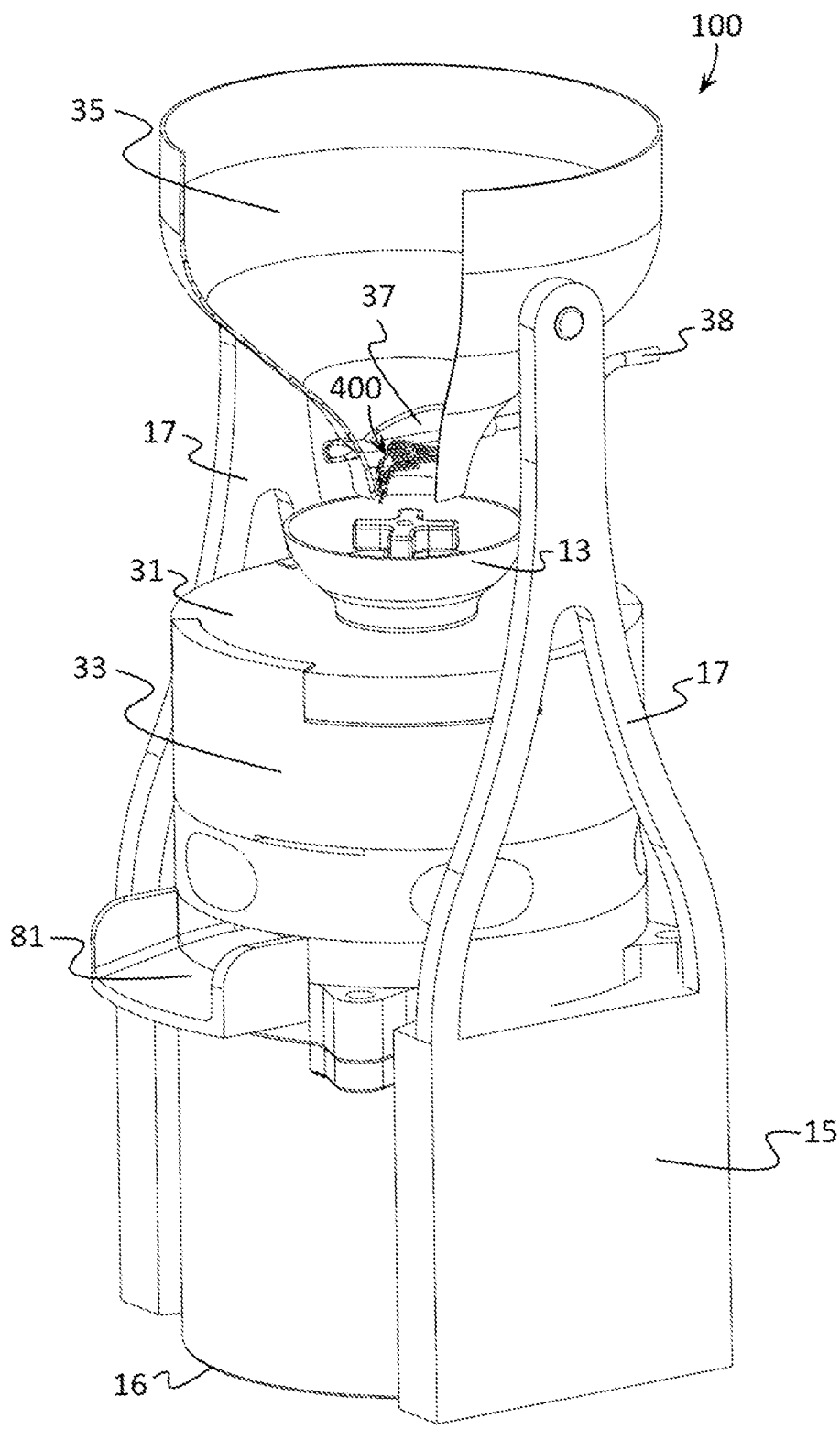
FIG. 23 shows a perspective view of the example foodstuff preparation device of FIG. 22 with a sectional view of the dispensing funnel according to various embodiments described herein.

FIG. 17 depicts a block diagram of an example of a device 100 according to various embodiments. In some embodiments, the device 100 may comprise one or more circuits, optionally integrally formed with or otherwise integrated with a heating element 12, grinding motor 14, and/or positional motivator 24, which may function as a control unit 90 and which be configured to control one or more functions of the device 100. In further embodiments, the device 100 can be a digital device that, in terms of hardware architecture, may optionally comprise a dedicated control unit 90. It should be appreciated by those of ordinary skill in the art that FIG. 17 depicts an example of a control unit 90 in an oversimplified manner, and a practical embodiment may include additional components or elements and suitably configured processing logic to support known or conventional operating features that are not described in detail herein.

The components of a control unit 90 and elements (12, 14, 21, 24, etc.) may be communicatively coupled via a local interface 96. The local interface 96 can be, for example but not limited to, one or more buses or other wired or wireless connections, integrated circuits, etc., as is known in the art. The local interface 96 can have additional elements, which are omitted for simplicity, such as controllers, buffers (caches), drivers, repeaters, and receivers, among many others, to enable communications. Further, the local interface 96 may include address, control, and/or data connections to enable appropriate communications among the aforementioned components.

In some embodiments, a control unit 90 may comprise one or more processors 91, I/O interfaces 92, radio modules 93, data stores 94, and/or memory 95. A processor 91 is a hardware device for executing software instructions. A processor 91 can be any custom made or commercially available processor, a central processing unit (CPU), an auxiliary processor among several processors, a semiconductor-based microprocessor (in the form of a microchip or chip set), or generally any device for executing software instructions. When in operation, a processor 91 is configured to execute software stored within the memory 95, to communicate data to and from the memory 95, and to generally control operations of the device 100 pursuant to the software instructions. In an exemplary embodiment, a processor 91 may include a mobile optimized processor such as optimized for power consumption and mobile applications.

In some embodiments, the device 100 may comprise one or more I/O interfaces 92 that can be used to input and/or output information and/or power to the device 100. In some embodiments, I/O interfaces 92 may include one or more turnable control knobs, depressible button type switches, a key pad, slide type switches, dip switches, rocker type switches, rotary dial switches, numeric input switches or any other suitable input which a user may interact with to provide input. In further embodiments, I/O interfaces 92 may include one or more light emitting elements or other display device, e.g., a LED (light emitting diodes), LED display, LCD display, a speaker, or any other suitable device for outputting or displaying information. The I/O interfaces 92 can also include, for example, a universal serial bus (USB) interface, a serial port, a parallel port, a small computer system interface (SCSI), an infrared (IR) interface, a radio frequency (RF) interface and the like. Preferably, the device 100 may comprise a power source, such as a rechargeable battery, capacitor, power cord or domestic electrical power supply, etc., and an I/O interface 92 may be used to provide electrical power to the power source for charging or other powering purposes.

In some embodiments, the device 100 may comprise a radio module 93 which may enable wireless communication to an external access device or network through an antenna. A radio module 93 may comprise a wireless communication receiver and optionally a wireless communication transmitter. Any number of suitable wireless data communication protocols, techniques, or methodologies can be supported by the radio module 93, including, without limitation: RF; IrDA (infrared); Bluetooth; ZigBee (and other variants of the IEEE 802.15 protocol); IEEE 802.11 (any variation such as WiFi); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

In some embodiments, the device 100 may comprise a data store 94 which may be used to store data. The data store 94 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 94 may incorporate electronic, magnetic, optical, and/or other types of storage media.

In some embodiments, the device 100 may comprise a memory 95 which may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 95 may incorporate electronic, magnetic, optical, and/or other types of storage media. Note that the memory 95 may have a distributed architecture, where various components are situated remotely from one another, but can be accessed by the processor 92. The software in memory 95 can include one or more software programs, each of which includes an ordered listing of executable instructions for implementing logical functions. In the example of FIG. 17, the software in the memory system 95 may include a suitable operating system (O/S) 97 and programs 98. An operating system 97 essentially controls the execution of input/output interface 90 functions, and provides scheduling, input-output control, file and data management, memory management, and communication control and related services. The operating system 97 may be, for example, LINUX (or another UNIX variant) and any Linux-kernel-based operating systems, Raspbian, Ubuntu, OpenELEC, RISC OS, Arch Linux ARM, OSMC (formerly Raspbmc) and the Kodi open source digital media center, Pidora (Fedora Remix), Puppy Linux, Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 98 may include various applications, add-ons, etc. configured to provide end user functionality such as to control the operation of functions of a heating element 12, grinding motor 14, roasting motor 21, positional motivator 24, or any other element of the device 100.

While some exemplary shapes and sizes have been provided for elements of the device 100, it should be understood to one of ordinary skill in the art that the roasting chamber 11, heating element(s) 12, housing 15, grinding stones 31, 32, 33, 34, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A foodstuff preparation device, the device comprising:
a roasting chamber having a roasting cavity;
a roasting motor, the roasting motor configured to rotate the roasting chamber;
a heating element configured to govern the temperature of the roasting cavity;
a first grinding stone;
a second grinding stone;
a grinding funnel for communicating a foodstuff, having a pre-ground particle size, between the first grinding stone and second grinding stone from the roasting chamber; and
a grinding motor configured to motivate the foodstuff between the first grinding stone and second grinding stone so that the foodstuff exits from between the first grinding stone and second grinding stone with a first ground particle size, the first ground particle size smaller than the pre-ground particle size.

2. The device of claim 1, further comprising an agitator, wherein the roasting motor is configured to rotate the roasting chamber in a first direction and an opposing second direction, wherein rotation of the roasting chamber in the first direction causes the agitator to prevent the foodstuff from exiting the roasting chamber, and wherein rotation of the roasting chamber in the second direction causes the agitator to motivate the foodstuff to exit the roasting chamber into the grinding funnel.

3. The device of claim 1, wherein the roasting chamber is movable between a first position and a second position, wherein foodstuff is prevented from exiting the roasting chamber when the roasting chamber is in the first position, and wherein foodstuff exits the roasting chamber into the grinding funnel when the roasting chamber is in the second position.

4. The device of claim 3, further comprising a roasting motor, the roasting motor configured to rotate the roasting chamber, and further comprising an agitator, wherein the roasting motor is configured to rotate the roasting chamber in a first direction and an opposing second direction, wherein rotation of the roasting chamber in the first direction causes the agitator to prevent the foodstuff from exiting the roasting chamber, and wherein rotation of the roasting chamber in the second direction causes the agitator to motivate the foodstuff to exit the roasting chamber into the grinding funnel.

5. The device of claim 1, wherein the first grinding stone comprises a first grinding interface that is planar in shape, and wherein the second grinding stone comprises an upper grinding interface that is planar in shape.

6. The device of claim 1, wherein the first grinding stone comprises a first grinding interface that is curved in shape, and wherein the second grinding stone comprises a second grinding interface that is curved in shape.

7. The device of claim 1, further comprising a third grinding stone and a fourth grinding stone, wherein foodstuff exiting from between the first grinding stone and second grinding stone are communicated between the third grinding stone and fourth grinding stone.

8. The device of claim 1, further comprising a third grinding stone, wherein foodstuff exiting from between the first grinding stone and second grinding stone are communicated between the second grinding stone and third grinding stone.

9. The device of claim 7, wherein the second grinding stone comprises a lower grinding interface that is curved in shape, and wherein the third grinding stone comprises a third grinding interface that is curved in shape.

10. The device of claim 7, wherein the second grinding stone comprises a lower grinding interface that is conical in shape, and wherein the third grinding stone comprises a third grinding interface that is conical in shape.

11. A foodstuff preparation device, the device comprising:
a first grinding stone;
a second grinding stone;
a funnel for communicating a foodstuff, having a pre-ground particle size, between the first grinding stone and second grinding stone;
a grinding motor configured to motivate the foodstuff between the first grinding stone and second grinding stone so that the foodstuff exits from between the first grinding stone and second grinding stone with a first ground particle size, the first ground particle size smaller than the pre-ground particle size; and
a third grinding stone and a fourth grinding stone, wherein foodstuff exiting from between the first grinding stone and second grinding stone are communicated between the third grinding stone and fourth grinding stone.

12. The device of claim 11, further comprising a dispensing funnel, the dispensing funnel positioned above the grinding funnel and configured to communicate the foodstuff, having a pre-ground particle size, into the grinding funnel.

13. The device of claim 11, further comprising a dispensing valve that is configured to control the communication of the foodstuff, having a pre-ground particle size, from the dispensing funnel into the grinding funnel.

14. The device of claim 11, wherein the first grinding stone comprises a first grinding interface that is planar in shape, and wherein the second grinding stone comprises an upper grinding interface that is planar in shape.

15. The device of claim 11, wherein the first grinding stone comprises a first grinding interface that is curved in shape, and wherein the second grinding stone comprises a second grinding interface that is curved in shape.

16. The device of claim 11, further comprising a third grinding stone, wherein foodstuff exiting from between the first grinding stone and second grinding stone are communicated between the second grinding stone and third grinding stone.

17. The device of claim 16, wherein the second grinding stone comprises a lower grinding interface that is curved in shape, and wherein the third grinding stone comprises a third grinding interface that is curved in shape.

18. The device of claim 16, wherein the second grinding stone comprises a lower grinding interface that is conical in shape, and wherein the third grinding stone comprises a third grinding interface that is conical in shape.

* * * * *